(12) United States Patent
Yasui et al.

(10) Patent No.: US 6,639,737 B2
(45) Date of Patent: Oct. 28, 2003

(54) ZOOM LENS SYSTEM AND PROJECTION APPARATUS USING THE SAME

(75) Inventors: Hiroto Yasui, Tochigi (JP); Fumihito Wachi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/028,095

(22) Filed: Oct. 25, 2001

(65) Prior Publication Data

US 2002/0176058 A1 Nov. 28, 2002

(30) Foreign Application Priority Data

Oct. 25, 2000 (JP) .......................................... 2000-325608
Dec. 15, 2000 (JP) .......................................... 2000-382666

(51) Int. Cl.$^7$ ............................. G02B 9/62; G02B 13/18
(52) U.S. Cl. ....................... 359/761; 359/676; 359/658; 359/713
(58) Field of Search ................................ 359/676–692, 359/649, 756, 761, 658, 713

(56) References Cited

U.S. PATENT DOCUMENTS

| | | | | | |
|---|---|---|---|---|---|
| 5,717,526 A | * | 2/1998 | Ohtake | ........................ | 359/683 |
| 5,880,892 A | * | 3/1999 | Ohtake | ........................ | 359/683 |
| 2002/0131184 A1 | * | 9/2002 | Yasui | ........................ | 359/680 |

* cited by examiner

Primary Examiner—Loha Ben
Assistant Examiner—M. Hasan
(74) Attorney, Agent, or Firm—Morgan & Finnegan, LLP

(57) ABSTRACT

A zoom lens system which allows a reduction in size. This zoom lens makes two points at different distances have an optically conjugate relationship, and sequentially includes, from a first conjugate point side at a longer distance to a second conjugate point side at a shorter distance, a first lens unit having a negative optical power, a second lens unit, a third lens unit, a fourth lens unit, a fifth lens unit, and a sixth lens unit. A plurality of lens units of the first to sixth lens units move for zooming, and at least one lens unit of the first to sixth lens units has a diffractive optical element.

36 Claims, 29 Drawing Sheets

ZOOM LENS SYSTEM AND PROJECTION APPARATUS USING THE SAME

BACKGROUND OF THE INVENTION

1. Field of the Invention

The present invention relates to a zoom lens system which is suitable for a projection apparatus for enlarging/projecting an image formed, for example, on a display member onto a screen, and a projection apparatus using the zoom lens system.

2. Related Background Art

Various projection optical systems for enlarging/projecting film images or projection original images from liquid crystal light bulbs onto screens and various projection apparatuses (projectors) using such optical systems have been proposed.

With the recent demands for an increase in the resolution of a projector and a reduction in size, there are increasing demands for a projection optical system which is used for the projector and has higher optical performance in terms of resolution and compactness.

Recently, as the demand for an increase in the resolution of a projection optical system has increased, proper correction of chromatic aberration, in particular, has been required. As a method of properly correcting chromatic aberration (magnification chromatic aberration, in particular), a method using a diffractive optical element for an optical system is available.

A technique of applying a diffractive optical element having a diffraction effect to a zoom lens is disclosed in Japanese Patent Application Laid-Open No. 2000-19400 (corresponding to U.S. Pat. No. 6,081,389).

According to Japanese Patent Application Laid-Open No. 2000-19400, a diffractive optical element is provided for a zoom lens constituted by five lens units as a whole. By optimizing the shape of this diffractive optical element, a projection optical system is obtained, which has little astigmatism and distortion aberration and has properly corrected magnification chromatic aberration in accordance with a high-resolution liquid crystal. The zoom lens proposed in this reference aims at correcting chromatic aberration (magnification chromatic aberration, in particular). However, there is no description about a reduction in the size of the projection optical system.

In general, in a color liquid crystal projector using a liquid crystal panel for an original image to be projected, it is especially important to properly correct chromatic aberration of various aberrations in the projection optical system (projection lens). If the chromatic aberration in the projection lens is not properly corrected, the color of a projection image blurs, affecting the image quality. In addition, recently, an important issue is how to realize a reduction in the size of the projection lens with a reduction in the size of the overall projector as well as how to realize high image quality.

SUMMARY OF THE INVENTION

It is an object of the present invention to provide a zoom lens system which properly corrects chromatic aberration while realizing a reduction in the size of the overall lens system, and has good optical performance throughout the entire zooming range and the entire screen.

In order to achieve the above object, according to an aspect of the present invention, there is provided a zoom lens system comprising, from a first conjugate point side (screen side) at a longer distance to a second conjugate point side (original image side) at a shorter distance, a first lens unit having a negative optical power, a second lens unit, a third lens unit, a fourth lens unit, a fifth lens unit, and a sixth lens unit, wherein a plurality of lens units of the first to sixth lens units move for zooming, and at least one lens unit of the first to sixth lens units has a diffractive optical element.

DETAILED DESCRIPTION OF THE PREFERRED EMBODIMENTS

Figure 1:
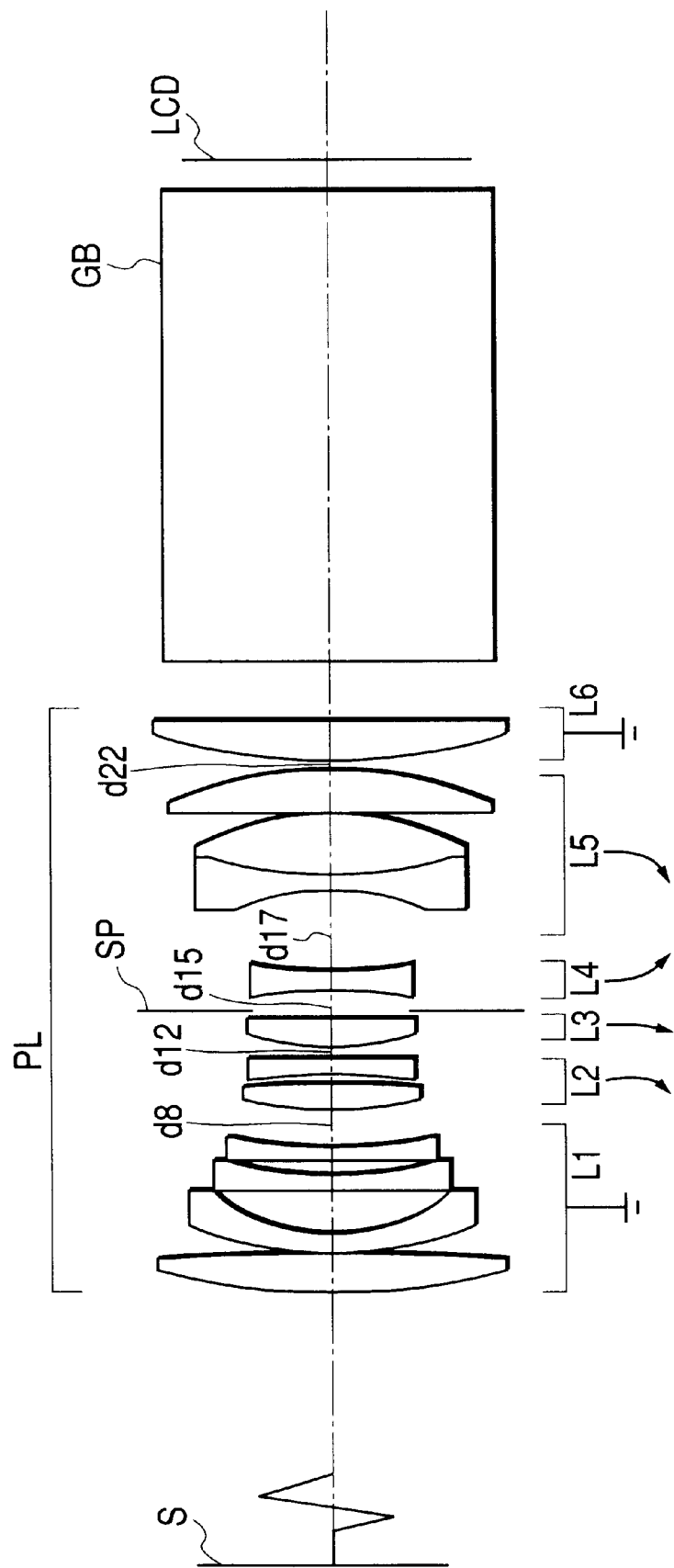
FIG. 1 is a sectional view of the lenses of a zoom lens system according to the first numerical embodiment.

A zoom lens system according to present embodiment is designed to make two points at different distances have a conjugate relationship. More specifically, this lens system includes a zoom lens for a projection lens which projects an original image formed at the second conjugate point at a shorter distance (on the reduction side) onto a screen at a longer distance (on the enlargement side). The zoom lens according to this embodiment will be described in detail below with reference to the accompanying drawings. FIGS. 1 to 4 are sectional views of zoom lenses according to the first to fourth numerical embodiments. FIGS. 5 to 7, FIGS. 8 to 10, FIGS. 11 to 13, and FIGS. 14 to 16 are aberration diagrams obtained from the zoom lenses according to the first to fourth numerical embodiments at the wide-angle end, middle zoom position, and tele-photo end, respectively. Each aberration diagram shows light beams B, G, and R respectively having wavelengths of 470 nm, 550 nm, and 650 nm, and a meridional and sagittal image planes ΔM and ΔS. Each of the sectional views of the lenses in FIGS. 1 to 4 shows a zoom lens PL serving as a projection lens, a screen S placed at the first conjugate point, and an original image LCD displayed on a liquid crystal panel (liquid crystal device) or the like placed at the second conjugate point. Referring to each of FIGS. 1 to 4, this zoom lens has first unit (first lens unit) L1 to sixth unit (sixth lens unit) L6. At least one of these lens units has at least one diffractive optical element. An aperture stop SP is interposed between the third unit L3 and the fourth unit L4 in each embodiment. A glass block GB corresponds to a color combining prism, polarizing filter, color filter, or the like. The arrows indicate the loci of the respective lens units in zooming from the short focal length end (so-called the wide-angle end) to the long focal length end (so-called tele-photo end).

In this embodiment, when zooming is performed from the wide-angle end to the tele-photo end, the fourth unit L4 is monotonously moved from the first conjugate point side (screen side) to the second conjugate point side (original image side), while the first and sixth units are fixed. In addition, focusing is performed by moving the first unit L1.

In the zoom lens according to this embodiment, the number of constituent lenses is increased to reduce the aberration share of each lens unit so as to increase the degree of freedom. For this purpose, this zoom lens has six lens units as a whole. Of these lens units, a plurality of lens units are moved to easily obtain a predetermined magnification ratio. A diffractive optical element is properly set for a predetermined lens unit of these lens units to realize a zoom lens which can correct chromatic aberration (magnification chromatic aberration, in particular) and is suitable for a projection lens for enlarging/projecting a liquid crystal image or the like, used in a liquid crystal projector or the like designed to reduce the size of the overall lens system.

The zoom lens according to each numerical embodiment will be described next with reference to the corresponding drawings.

According to the first numerical embodiment shown in FIG. 1, the first unit L1 having a negative optical power (the reciprocal of the focal length), the second unit L2 having a positive optical power, the third unit L3 having a positive optical power, the fourth unit L4 having a negative optical power, the fifth unit L5 having a positive optical power, and the sixth unit L6 having a positive optical power are arranged in the order named from the screen S side. A diffractive optical element is provided for the fifth unit L5. In this case, the third unit L3 is formed by one positive lens, and the fourth unit L4 is formed by one negative lens. In zooming from the wide-angle end to the tele-photo end, the fourth unit L4 is monotonously moved from the screen side to the original image side, while the first and sixth lens units L1 and L6 are fixed. All the remaining lens units are moved from the original image side to the screen side. In addition, focusing is performed by moving the first unit L1.

Figure 2:
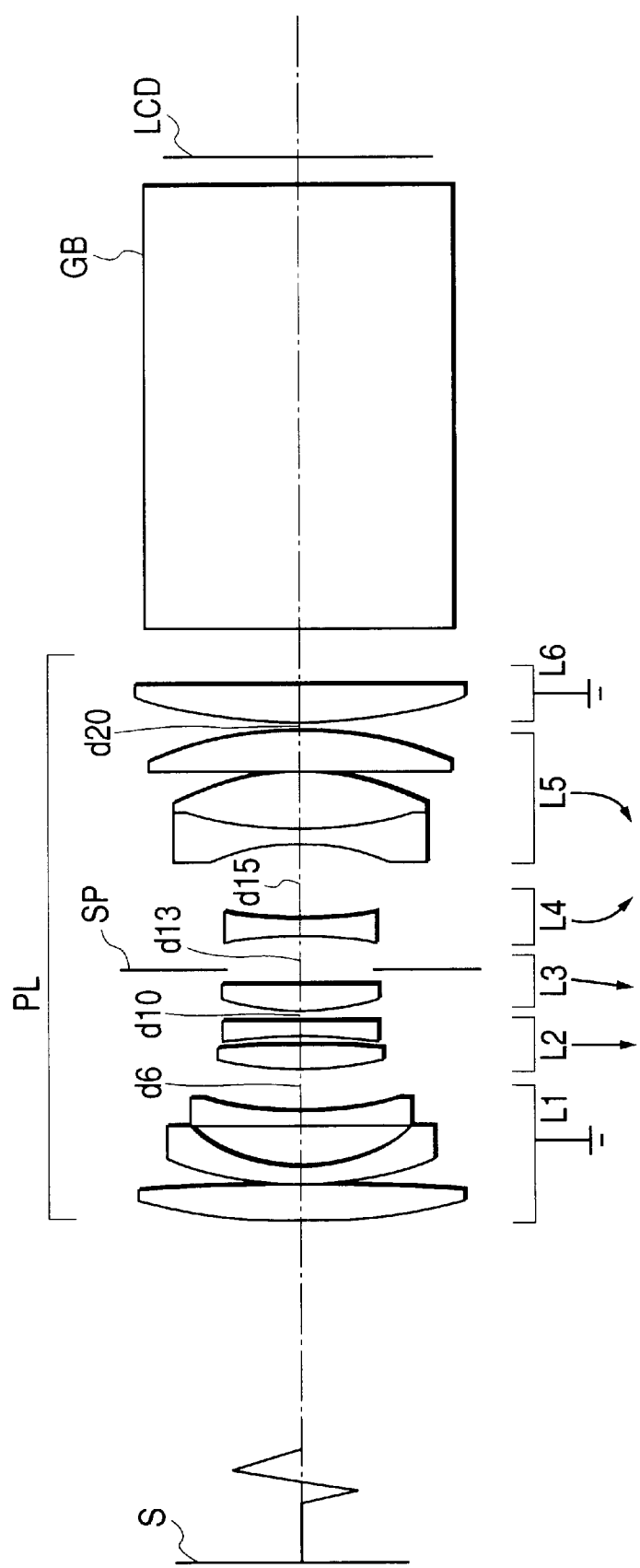
FIG. 2 is a sectional view of the lenses of a zoom lens system according to the second numerical embodiment.

In the second numerical embodiment shown in FIG. 2, as in the first numerical embodiment, the first unit L1 having a negative optical power, the second unit L2 having a positive optical power, the third unit L3 having a positive optical power, the fourth unit L4 having a negative optical power, the fifth unit L5 having a positive optical power, and the sixth unit L6 having a positive optical power are arranged in the order named from the screen side. A diffractive optical element is provided for the fifth unit L5. In this case, the first unit L1 is comprised of three lenses, which is equivalent to the first unit L1 in the first numerical embodiment in FIG. 1 from which one concave lens (negative lens) located nearest to the original image side is omitted. Each of the remaining lens units has the same lens arrangement as that in the first numerical embodiment in FIG. 1. In zooming from the wide-angle end to the tele-photo end, the second and third units L2 and L3 move more to the screen side by a distance corresponding to the omission of one concave lens of the first unit L1 which is located nearest to the original image side, and the fourth unit L4 monotonously moves to the original image side. The fifth unit L5 moves from the original image side to the screen side. As a consequence, in zooming, the third and fourth units L3 and L4 move with their distance increasing as compared with the case of the first numerical embodiment. Note that the first and sixth units L1 and L6 are fixed during zooming, and the first unit L1 is moved to perform focusing.

Figure 3:
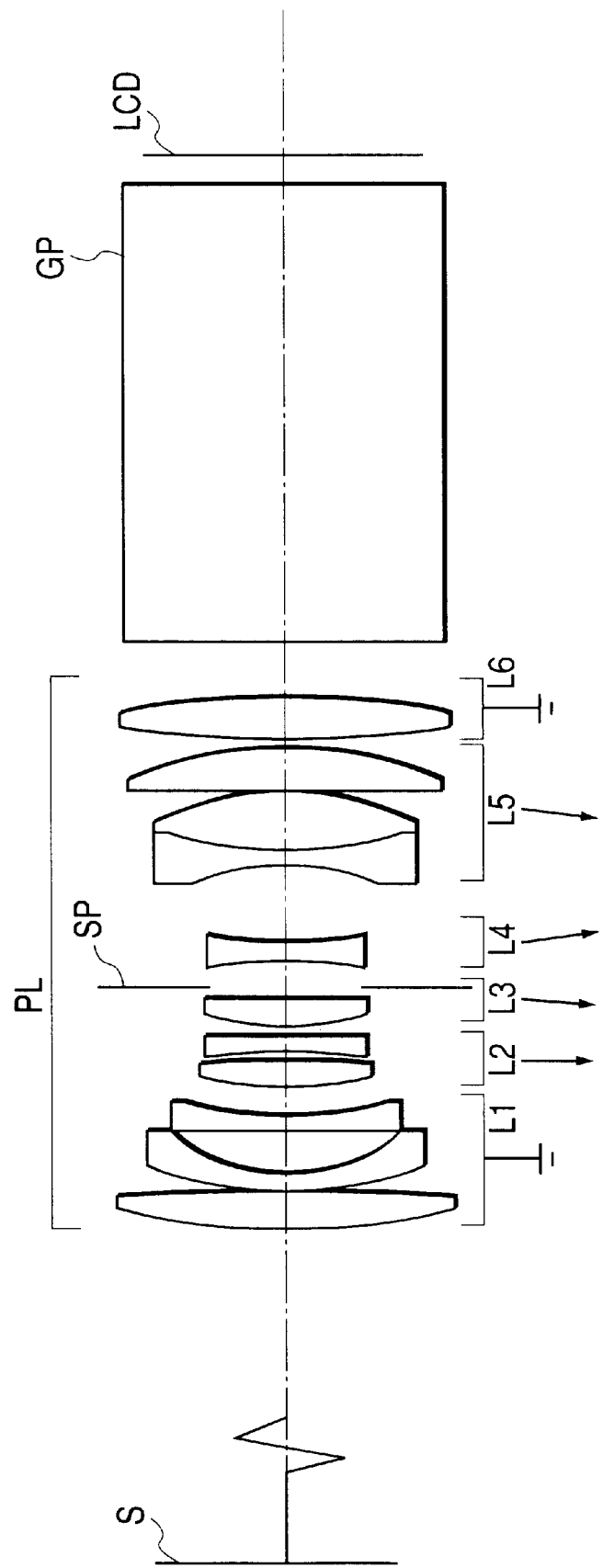
FIG. 3 is a sectional view of the lenses of a zoom lens system according to the third numerical embodiment.

According to the third numerical embodiment shown in FIG. 3, the first unit L1 having a negative optical power, the second unit L2 having a negative optical power, the third unit L3 having a positive optical power, the fourth unit L4 having a negative optical power, the fifth unit L5 having a positive optical power, and the sixth unit L6 having a positive optical power are arranged in the order named from the screen side. A diffractive optical element is provided for the fifth unit L5. In this case, the first unit L1 is comprised of three lenses as in the second numerical embodiment. The third unit L3 is formed by one positive lens, and the fourth unit L4 is formed by one negative lens. In zooming from the wide-angle end to the tele-photo end, as in the second numerical embodiment, the third and fourth units L3 and L4 move with their distance increasing as compared with the case of the first numerical embodiment. At this time, the first and sixth units L1 and L6 are fixed. The first unit L1 is moved to perform focusing.

Figure 4:
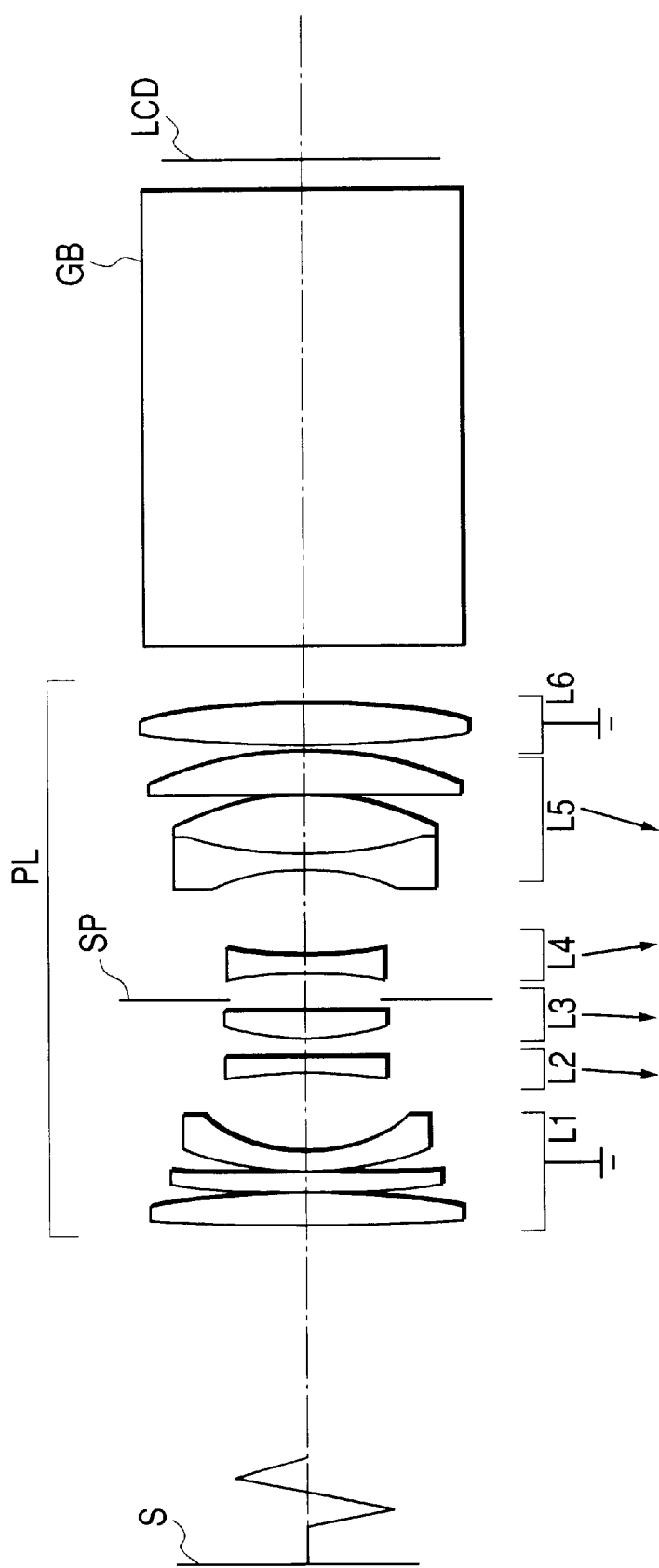
FIG. 4 is a sectional view of the lenses of a zoom lens system according to the fourth numerical embodiment.
Figure 5:
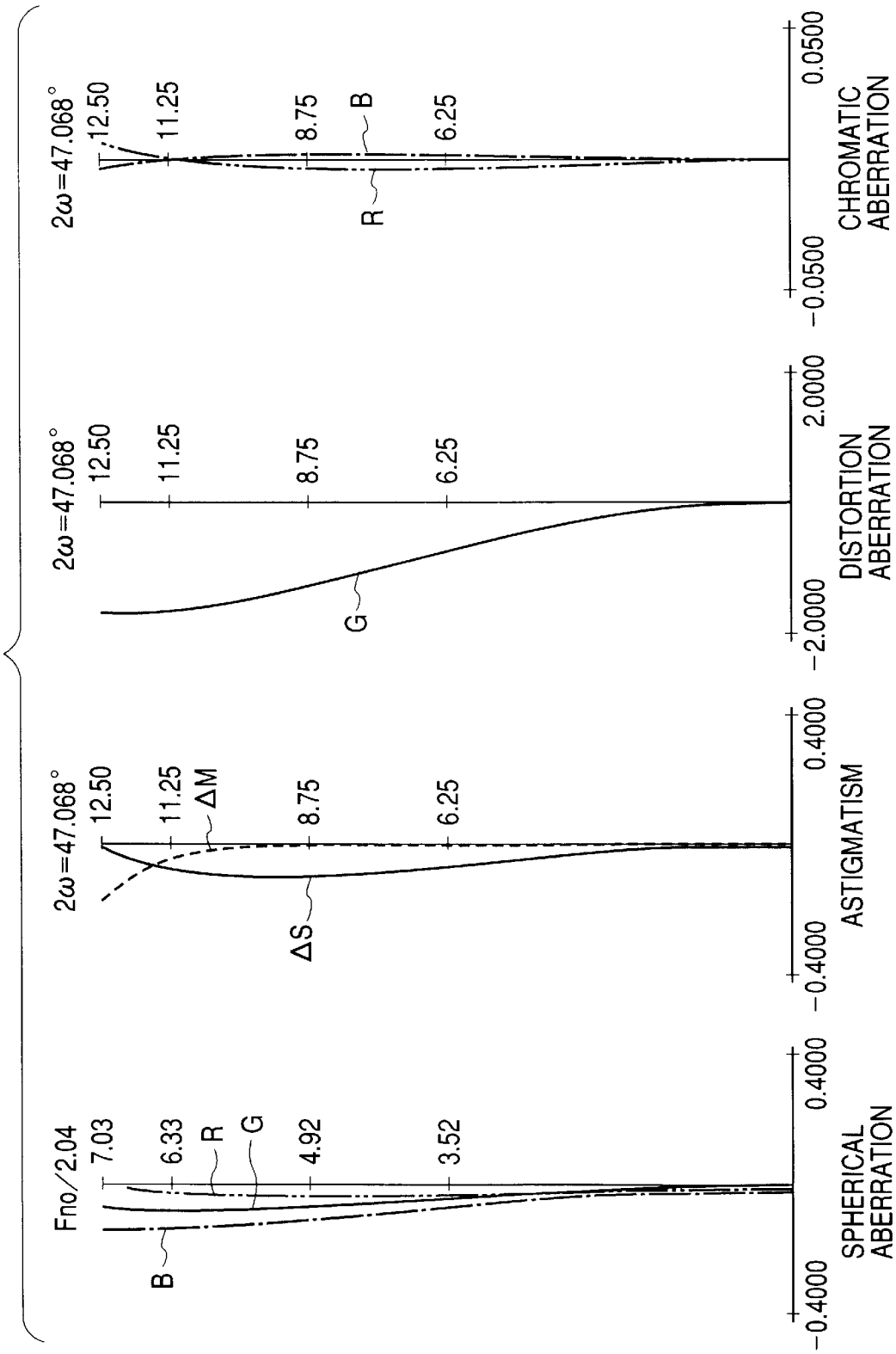
FIG. 5 is an aberration diagram of the zoom lens system according to the first numerical embodiment at the short focal length end.
Figure 6:
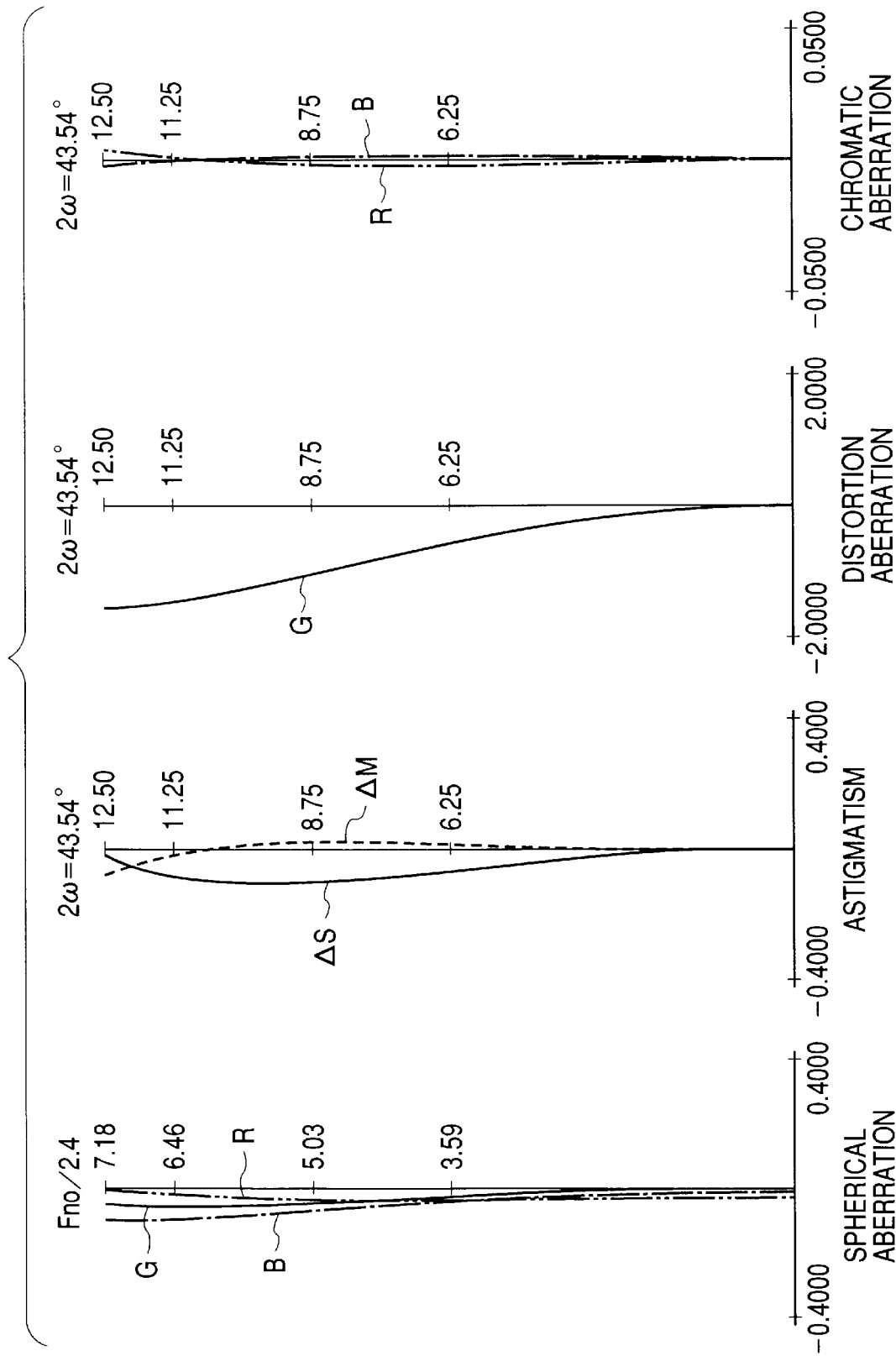
FIG. 6 is an aberration diagram of the zoom lens system according to the first numerical embodiment at the middle zoom position.
Figure 7:
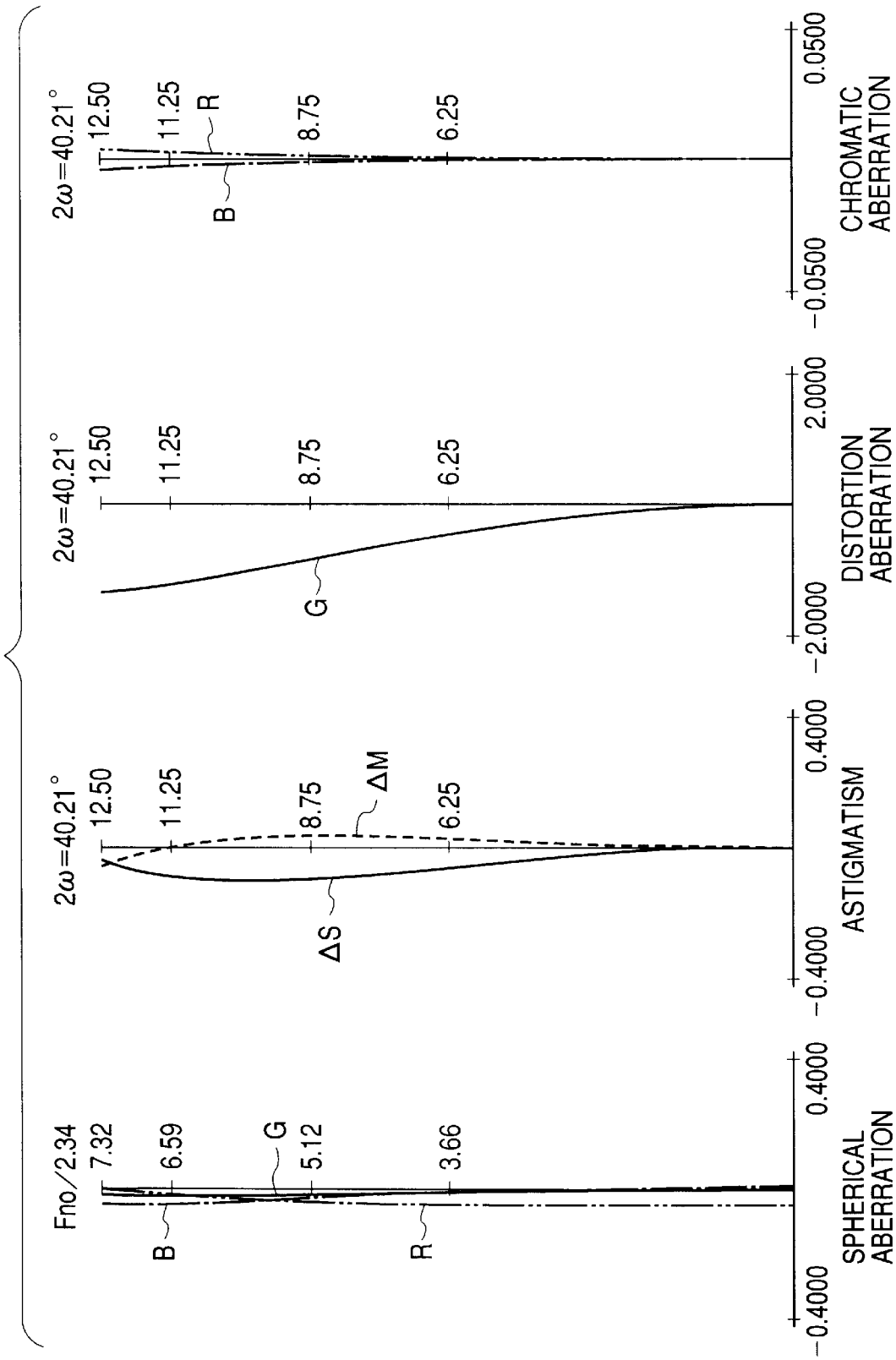
FIG. 7 is an aberration diagram of the zoom lens system according to the first numerical embodiment at the long focal length end.
Figure 8:
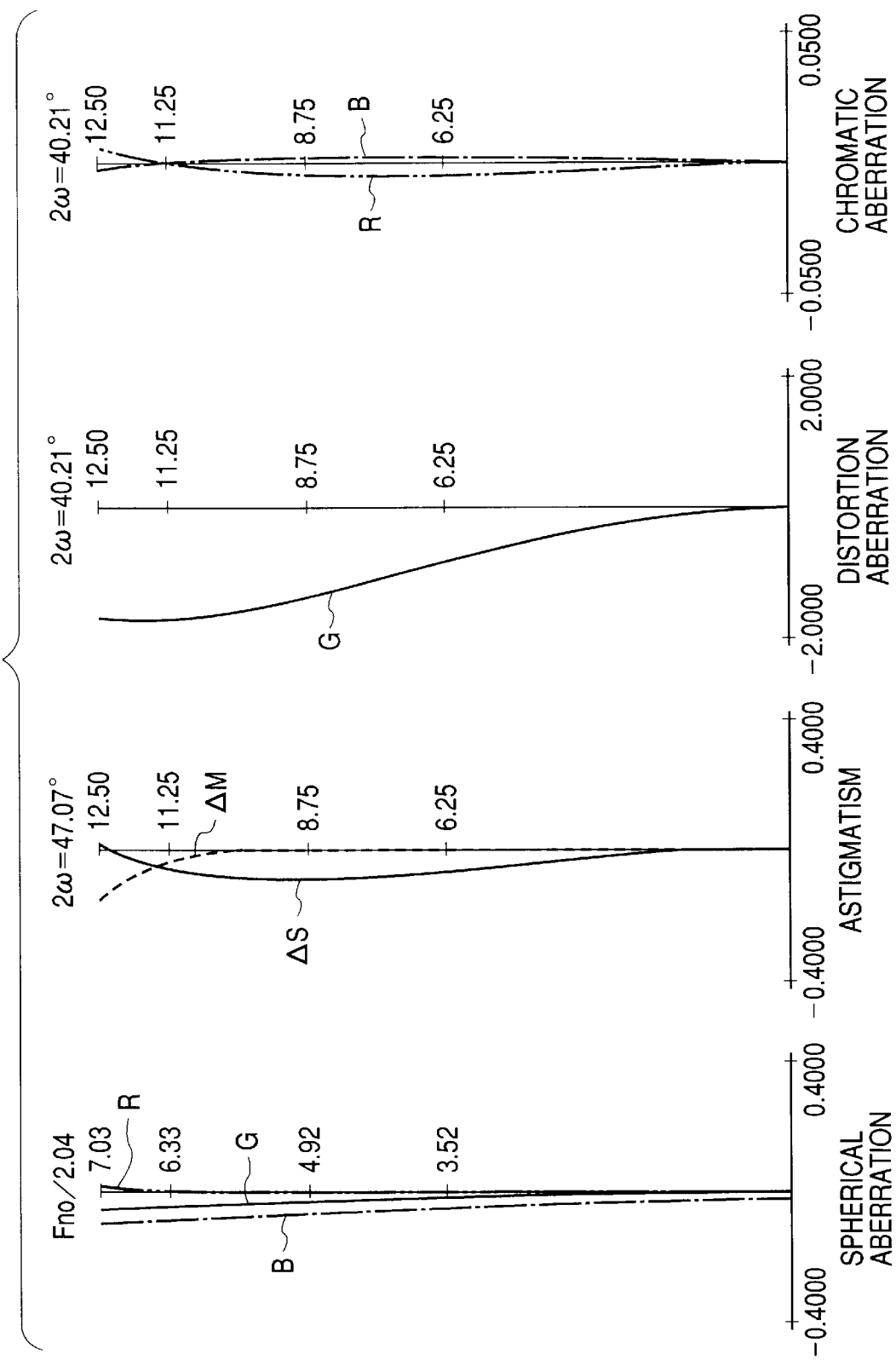
FIG. 8 is an aberration diagram of the zoom lens system according to the second numerical embodiment at the short focal length end.
Figure 9:
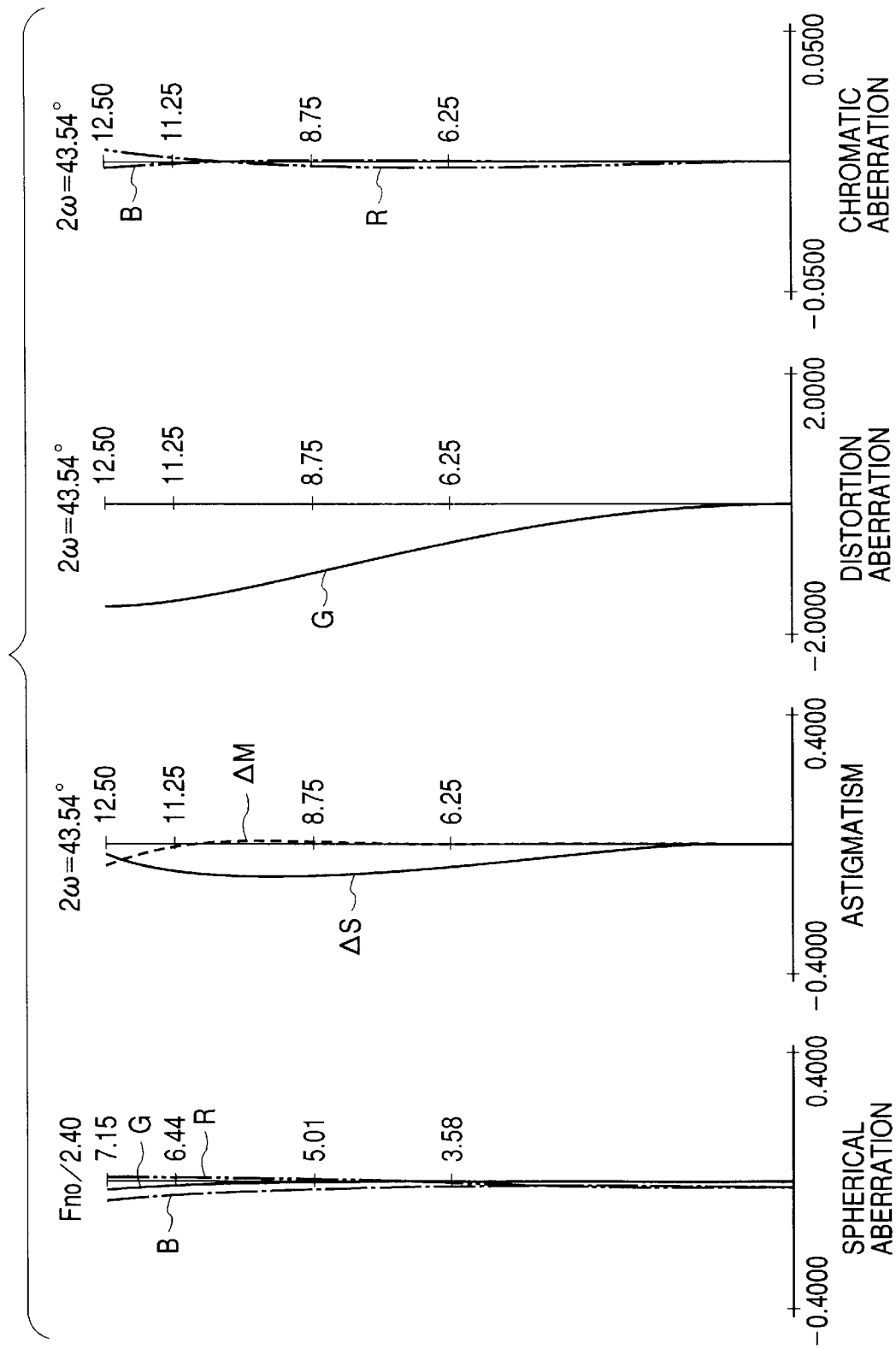
FIG. 9 is an aberration diagram of the zoom lens system according to the second numerical embodiment at the middle zoom position.
Figure 10:
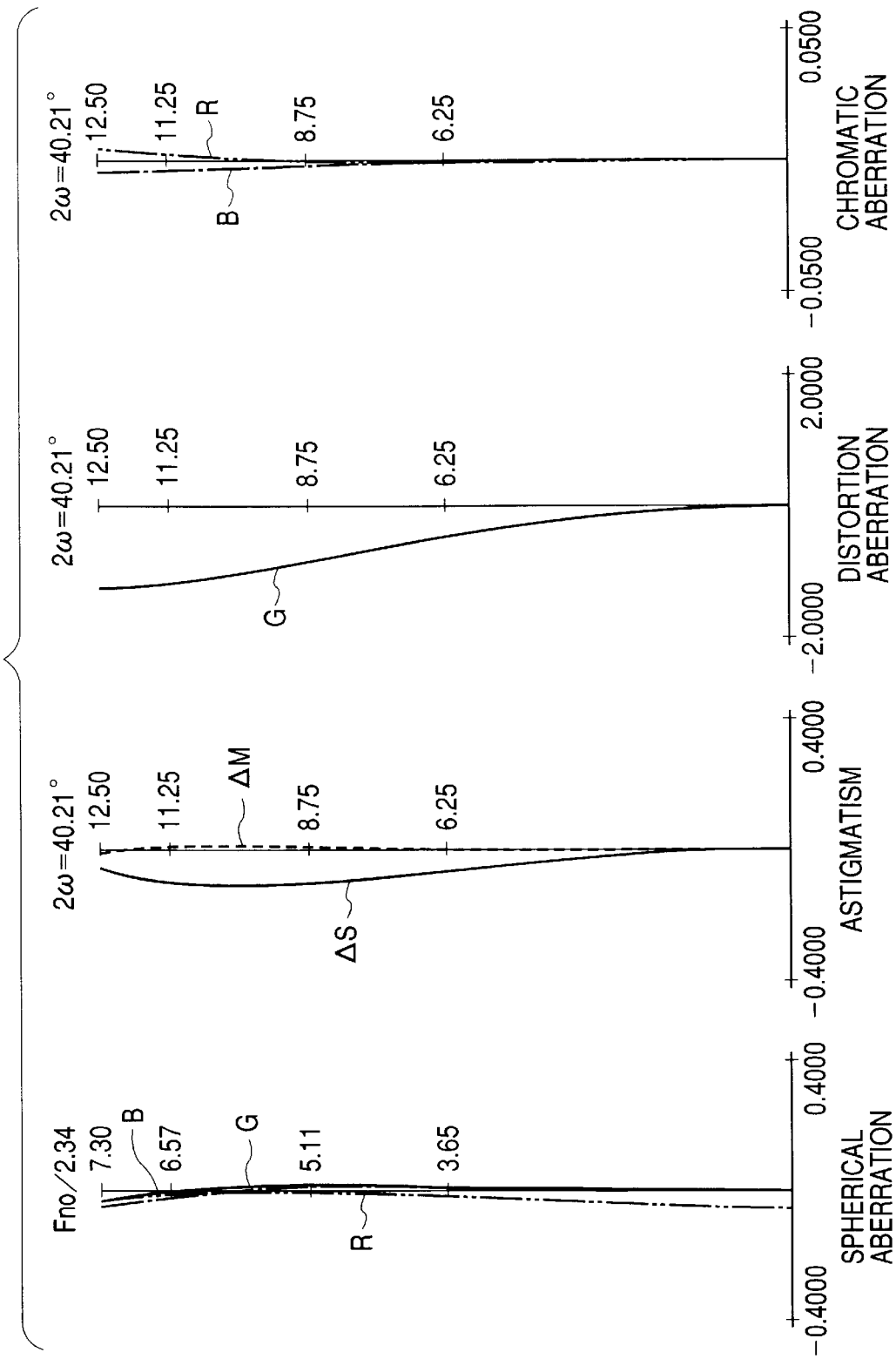
FIG. 10 is an aberration diagram of the zoom lens system according to the second numerical embodiment at the long focal length end.
Figure 11:
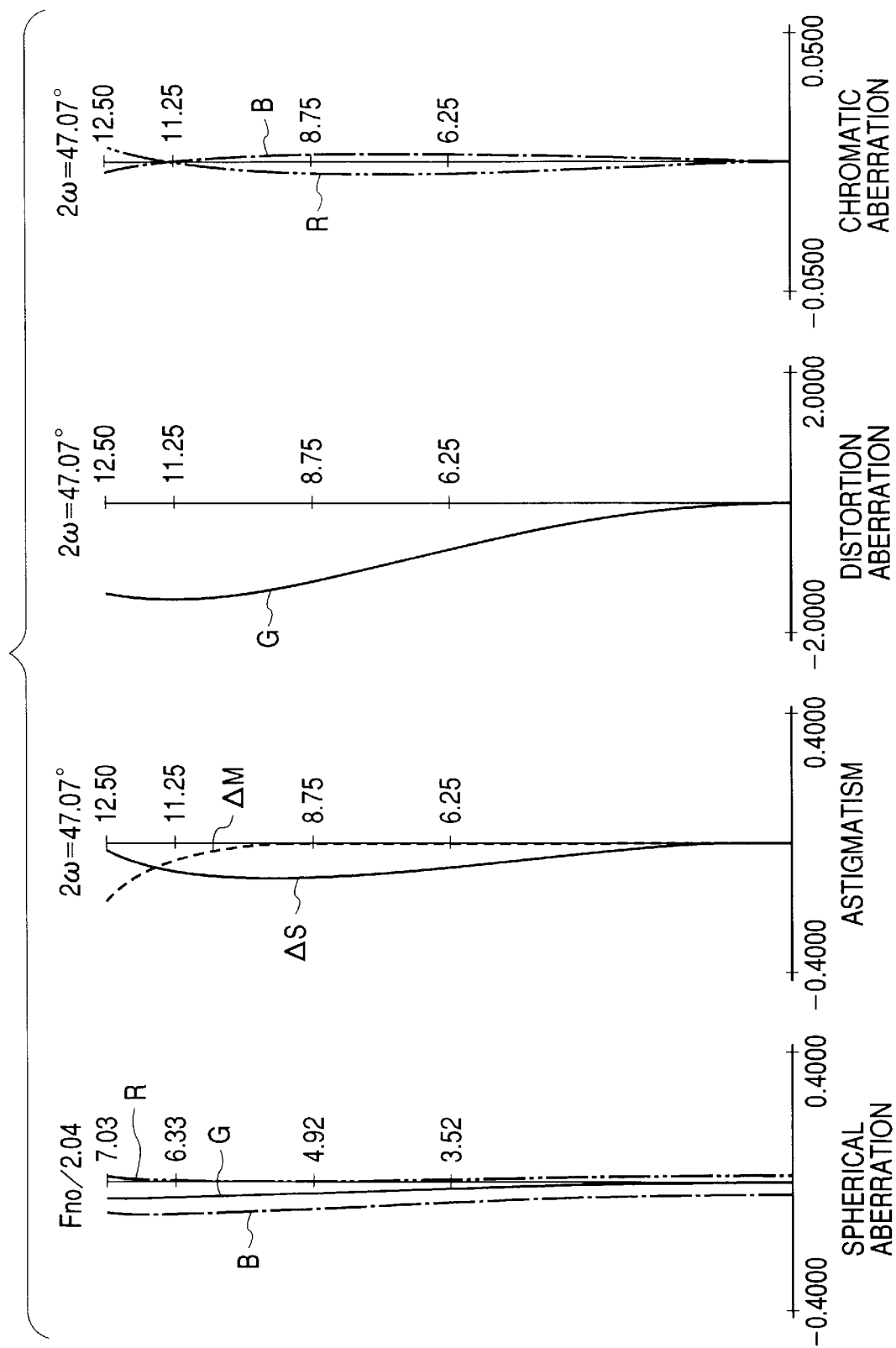
FIG. 11 is an aberration diagram of the zoom lens system according to the third numerical embodiment at the short focal length end.
Figure 12:
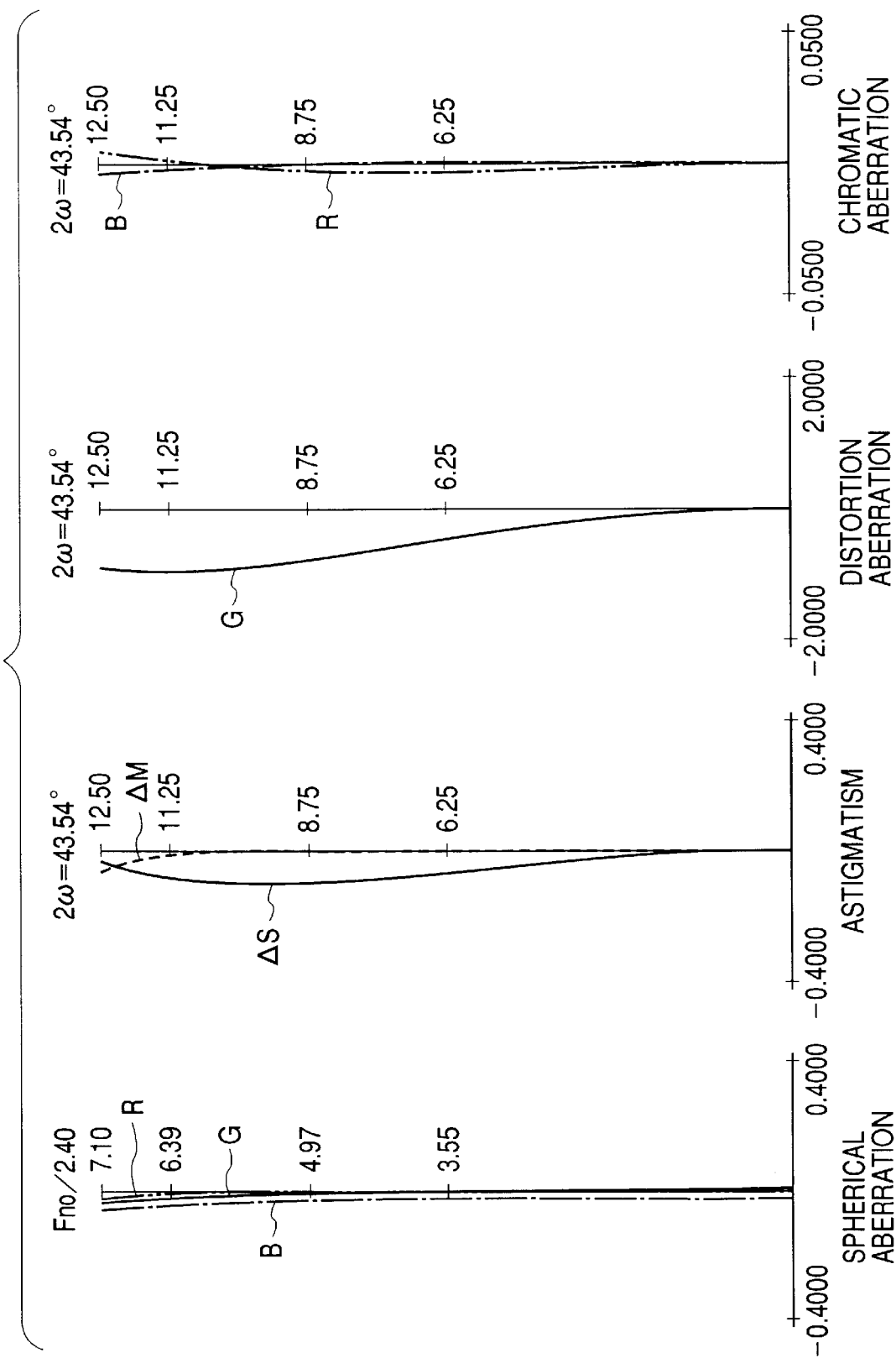
FIG. 12 is an aberration diagram of the zoom lens system according to the third numerical embodiment at the middle zoom position.
Figure 13:
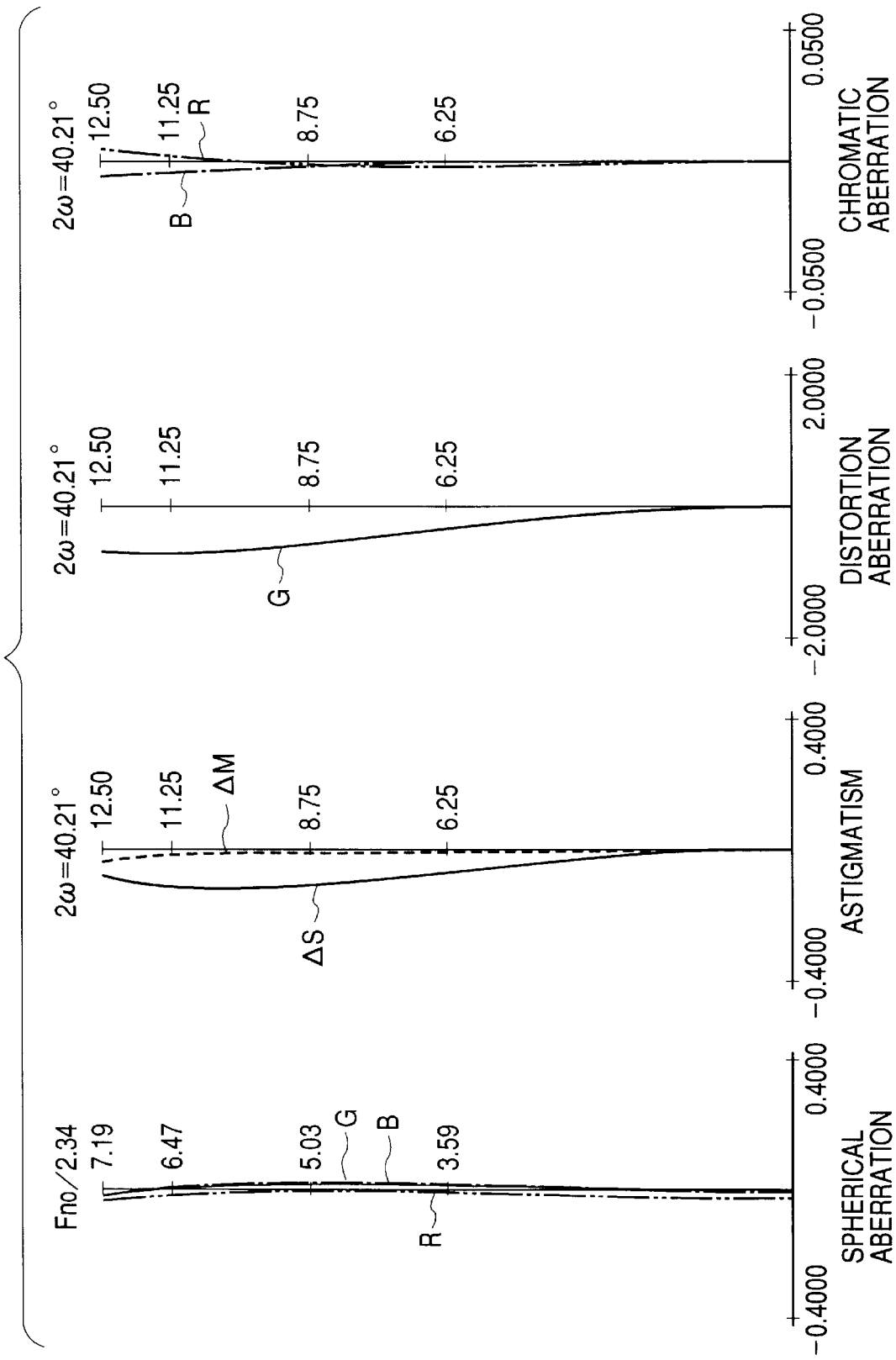
FIG. 13 is an aberration diagram of the zoom lens system according to the third numerical embodiment at the long focal length end.
Figure 14:
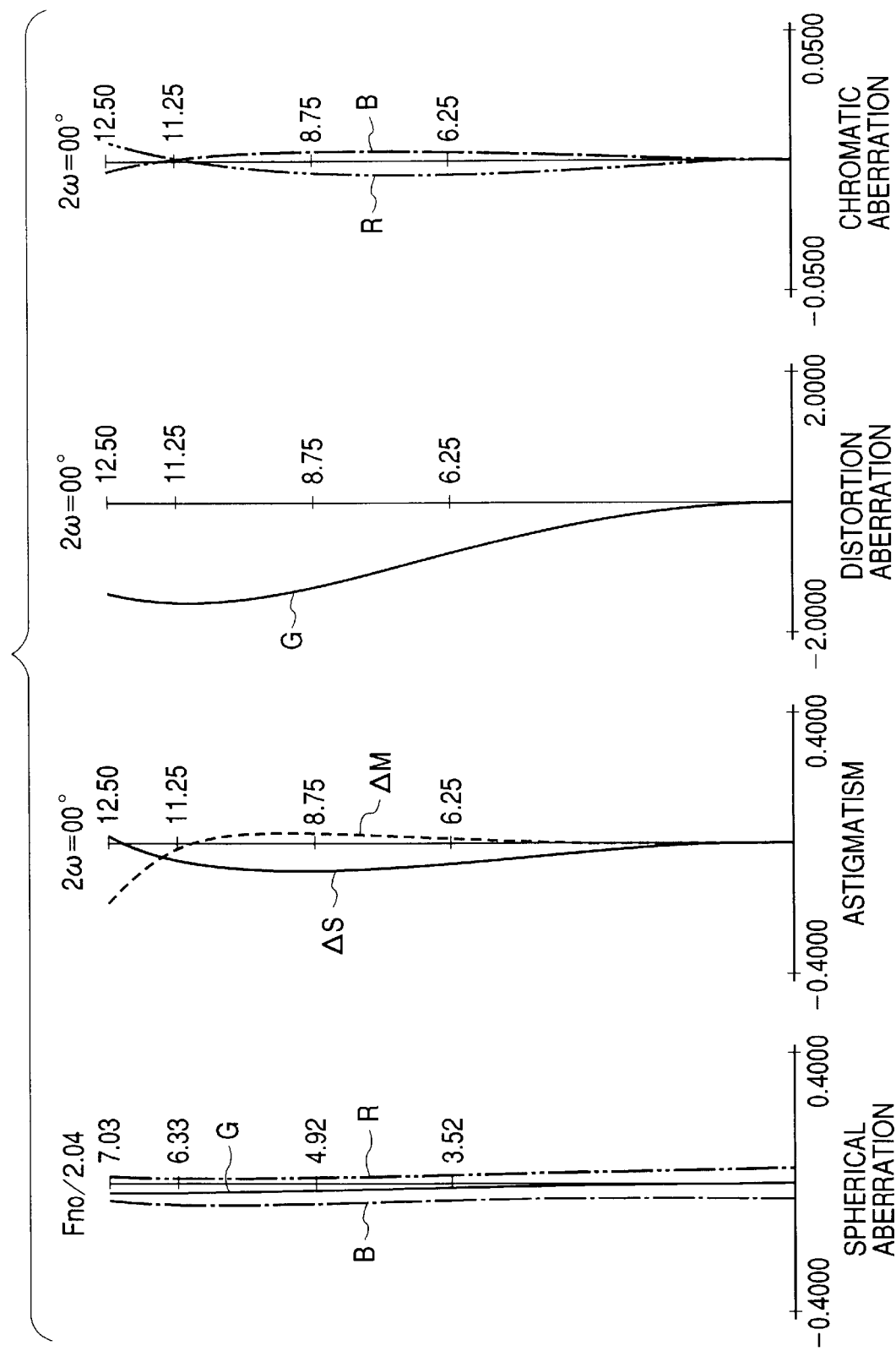
FIG. 14 is an aberration diagram of the zoom lens system according to the fourth numerical embodiment at the short focal length end.
Figure 15:
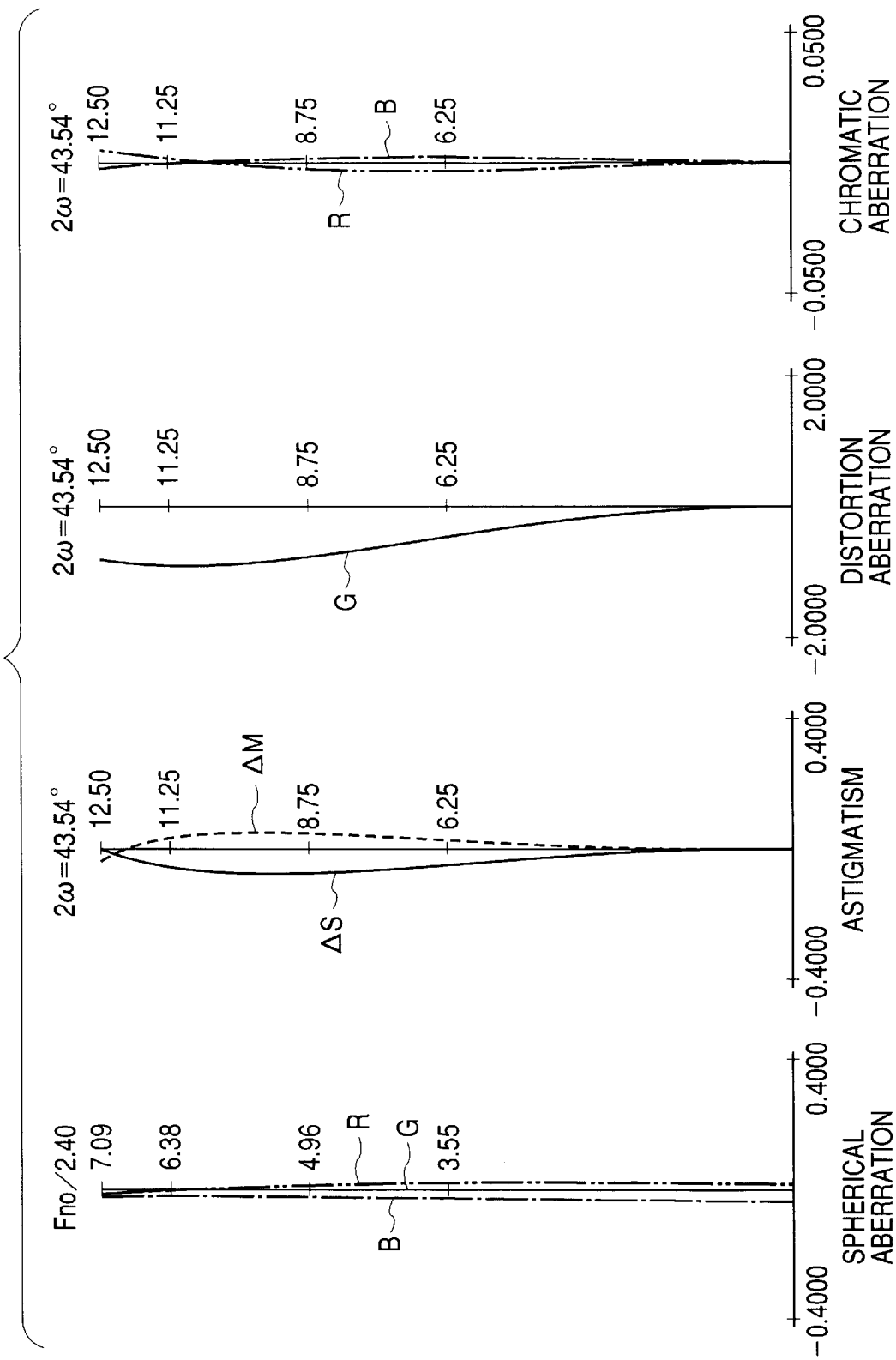
FIG. 15 is an aberration diagram of the zoom lens system according to the fourth numerical embodiment at the middle zoom position.
Figure 16:
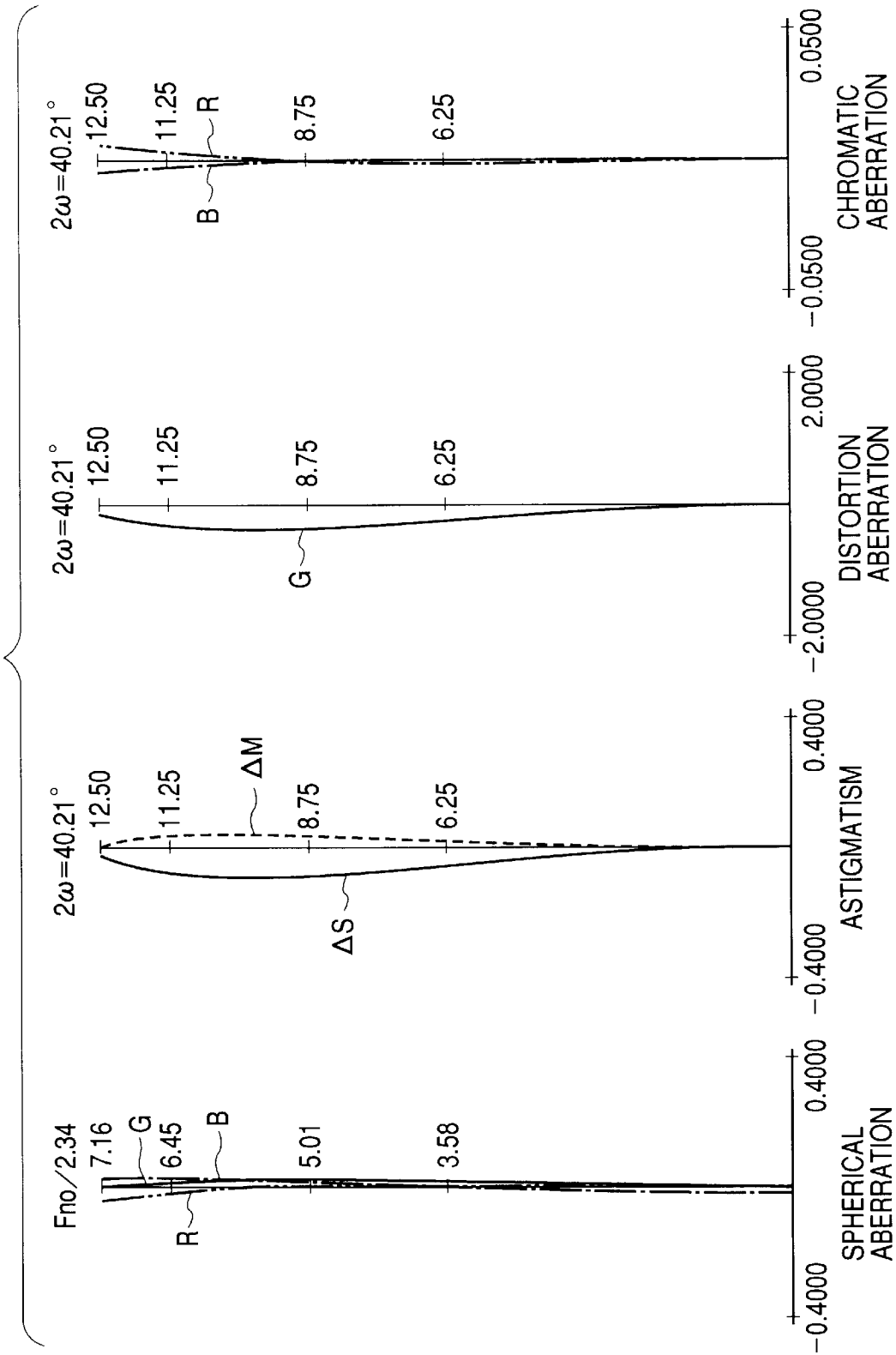
FIG. 16 is an aberration diagram of the zoom lens system according to the fourth numerical embodiment at the long focal length end.

According to the fourth numerical embodiment shown in FIG. 4, as in the third numerical embodiment, the first unit L1 having a negative optical power, the second unit L2 having a negative optical power, the third unit L3 having a positive optical power, the fourth unit L4 having a negative optical power, the fifth unit L5 having a positive optical power, and the sixth unit L6 having a positive optical power are arranged in the order named from the screen side. A diffractive optical element is provided for the fifth unit L5. In this case, the first unit L1 is comprised of three lenses. The second unit L2 is formed by one negative lens. The third unit L3 is formed by one positive lens, and the fourth unit L4 is formed by one negative lens. In zooming from the wide-angle end to the tele-photo end, the third and fourth units L3 and L4 move with their distance increasing as compared with the case of the third numerical embodiment. At this time, the first and sixth units L1 and L6 are fixed. The first unit L1 is moved to perform focusing.

In the zoom lens according to this embodiment, to obtain good optical performance throughout the entire zooming range, at least one of the following conditions preferably holds.

(A-1) In zooming from the wide-angle end to the tele-photo end, it is preferable to monotonously move the fourth unit from the enlargement conjugate side to the reduction conjugate side and satisfy $$1.1 < d4W/d4T < 3.0 \tag{1}$$

where d4W is the distance between the fourth and fifth units at the wide-angle end, and d4T is the distance between the fourth and fifth units at the tele-photo end.

Conditional expression (1) is associated with the distances between the fourth and fifth units at the wide-angle end and tele-photo end. If the distance between the fourth and fifth units at the wide-angle end exceeds the upper limit value of conditional expression (1), the rear-element diameter (the diameter of the lens nearest to the original image side; ditto for the following description) undesirably increases. If the distance between the fourth and fifth units at the wide-angle end decreases below the lower limit value of conditional expression (1), the position of the pupil viewed from the original image side (the exit pupil formed when a light beam is traced from the screen side to the original image side) greatly varies to an undesired degree during zooming.

(A-2) In zooming from the wide-angle end to the tele-photo end, it is preferable to move the second unit from the reduction conjugate side to the enlargement conjugate side and satisfy $$1.0 < d1W/d1T < 3.0 \tag{2}$$

where d1W is the distance between the first and second units at the wide-angle end, and d1T is the distance between the first and second units at the tele-photo end.

Conditional expression (2) is associated with the distances between the first and second units at the wide-angle end and tele-photo end. If the distance between the first and second units at the wide-angle end exceeds the upper limit value of conditional expression (2), the total lens length undesirably increases. If the distance between the first and second units at the wide-angle end decreases below the lower limit value of conditional expression (2), the front-element diameter (the diameter of the lens nearest to the screen side; ditto for the following description) undesirably increases.

(A-3) It is preferable to satisfy $$0.1 < |M2/M4| < 2.0 \tag{3}$$

where M2 is the moving amount of the second unit in zooming from the wide-angle end to the tele-photo end, and M4 is the moving amount of the fourth unit in zooming from the wide-angle end to the tele-photo end.

When each lens unit moves to the original image side, the corresponding moving amount is indicated by a plus sign, whereas when each lens unit moves to the screen side, the corresponding moving amount is indicated by a minus sign.

Conditional expression (3) is associated with the moving amounts of the second and fourth units in zooming. If the moving amount of the second unit exceeds the upper limit value of conditional expression (3), the front-element diameter undesirably increases. If the moving amount of the second unit decreases below the lower limit value of conditional expression (3), a predetermined magnification ratio is difficult to ensure.

(A-4) It is preferable to satisfy $$0.1 < |M5/M4| < 3.0 \tag{4}$$

where M4 is the moving amount of the fourth unit in zooming from the wide-angle end to the tele-photo end, and M5 is the moving amount of the fifth unit in zooming from the wide-angle end to the tele-photo end.

Conditional expression (4) is associated with the moving amounts of the fourth and fifth units in zooming. If the moving amount of the fifth unit exceeds the upper limit value of conditional expression (4), the total lens length and rear-element diameter undesirably increase. If the moving amount of the fifth unit decreases below the lower limit value of conditional expression (4), a predetermined magnification ratio is difficult to ensure.

(A-5) In this embodiment, regarding the phone at which the diffractive optical element is located, if an on- and off-axis light beams passing through each optical system differ in their angles with respect to the normal direction at the respective incident positions, a deterioration in diffraction efficiency may occur. For this reason, a diffractive optical element is preferably set on a lens surface which is made as concentric as possible with respect to the on- and off-axis light beams.

(A-6) No diffractive optical element is preferably set on the outermost surface of the lens system except for a special case, e.g., a case wherein such an element must be set for aberration correction. This is because the diffractive optical element is made of very narrow grooves (grooves with widths on the several-micron or submicron order), and is preferably placed at a position other the outermost position to protect the optical element surface from dust and the like.

(A-7) In this embodiment, in consideration of correction of chromatic aberration, the above diffractive optical element is preferably provided for a lens unit that satisfies the following conditions.

In examining a lens unit for which a diffractive optical element should be provided, consider a paraxial arrangement constituted by thin single lenses in each embodiment for the sake of simplicity. In addition, letting h be the height from the optical axis of a paraxial light beam passing through each lens unit and $\bar{h}$ be the height from the optical axis of a pupil paraxial light beam, consider the relationship between these heights and chromatic aberration.

First of all, letting L be the longitudinal chromatic aberration coefficient of the overall optical system before the provision of the diffractive optical element, T be the magnification chromatic aberration coefficient, $L_D$ be the longitudinal chromatic aberration coefficient of the lens unit for which the diffractive optical element is provided, $T_D$ be the magnification chromatic aberration coefficient, $L_{TOT}$ be the longitudinal chromatic aberration coefficient of the overall system after the provision of the diffractive optical element, and $T_{TOT}$ be the magnification chromatic aberration coefficient, the following expressions hold.

$$\begin{cases} L_{TOT} = L + L_D \\ T_{TOT} = T + T_D \end{cases} \quad (a)$$

$$\begin{cases} L_D = h_D^2 + \dfrac{\phi_D}{v_D} \\ T_D = h_D \bar{h}_D \dfrac{\phi_D}{v_D} \end{cases} \quad (b)$$

where $h_D$ and $\bar{h}_D$ are the height from the optical axis of a paraxial light beam passing through the lens unit for which the diffractive optical element has been provided and the height from the optical axis of a pupil paraxial light beam, $\phi_D$ is the optical power of the diffractive optical element, and $v_D$ be the Abbe number, which is −3.45.

In addition, the following expression holds between each chromatic aberration coefficient of the above longitudinal chromatic aberration coefficient and magnification chromatic aberration coefficient and each chromatic aberration of the longitudinal chromatic aberration and magnification chromatic aberration.

$$\begin{cases} \text{(longitudinal chromatic aberration)} \propto -Ly \\ \text{(magnification chromatic aberration)} \propto -T_{\tan\omega} \end{cases} \quad (c)$$

where ω is the half field angle of each light beam.

As for chromatic aberrations in a projection optical system used in, for example, a liquid crystal projector, both longitudinal and magnification chromatic aberrations generally tend to occur on the positive side. As is obvious from this, both the longitudinal chromatic aberration coefficient L and magnification chromatic aberration coefficient T of the overall system before the provision of the diffractive optical element become negative value according to expression (c) given above. To correct these longitudinal and magnification chromatic aberrations, each of the values of the chromatic aberration coefficients $L_{TOT}$ and $T_{TOT}$ of overall system after the provision of the diffractive optical element may be brought near to 0 in consideration of the third-order aberration coefficient level. As described above, considering that both the longitudinal chromatic aberration coefficient L and magnification chromatic aberration coefficient T of the overall system before the provision of the diffractive optical element are negative values, and expression (a) given above, the diffractive optical element may be provided for a unit whose longitudinal chromatic aberration coefficient $L_D$ and magnification chromatic aberration coefficient $T_D$ have positive values.

Consider this technique in association with each embodiment. If a diffractive optical element is provided for one of lens units (fourth, fifth, and sixth units) located closer to the reduction conjugate side than the aperture stop interposed between the third and fourth units, since the element is located in the direction in which both chromatic aberrations, i.e., longitudinal chromatic aberration and magnification chromatic aberration, are simultaneously corrected, a better effect can be obtained. It is especially preferable to provide the diffractive optical element for the fifth unit, of the above lens units, considering that, for example, the element is preferably placed on a most concentric lens surface and the lens surface is preferably located at the position other the outermost position to be protected against dust and heat from a light source.

A method of manufacturing a diffractive optical element and its shape will be described next.

The diffractive optical element used in this embodiment is formed on an optical surface. The base of this element may be a spherical surface, flat surface, aspherical surface, or quadratic curved surface. This element may be formed by a method (so-called replica aspherical surface method) of forming a plastic layer or the like as the above diffraction optical surface and applying the layer on such an optical surface.

Examples of the method of manufacturing the diffractive optical element in this embodiment are a method of directly forming a binary optics shape on a lens surface by photolithography and a method of performing replica molding or molding by using the mold formed by the method using photolithography. If a kinoform member in a sawtooth shape is formed as this surface or member, a diffraction efficiency as high as an ideal value can be expected.

Letting λ be the reference wavelength (d line), H be the distance from the optical axis, and φ(H) be the phase, the phase shape of the diffractive optical element in this embodiment can be expressed by $$\phi(H) = 2\pi/\lambda(C_1 \cdot H^2 + C_2 \cdot H^4 + \ldots + C_i \cdot H^{2i}) \quad (d)$$

where φ(H) is the phase shape of the diffraction surface, H is the distance to the optical axis in the vertical direction, λ is the design wavelength (first order in this case), and $C_n$ is the nth-order phase coefficient. As is obvious from equation (d), the phase is adjusted by the distance H from the optical axis. As the lens diameter increases, the influences of higher-order coefficients can be increased.

In each embodiment, in consideration of the effective use of the diffractive optical element for aberration correction and a reduction in total lens length, coefficients are preferably set to satisfy the following conditional expressions:

$$1.0 \times 10^{-5} < |C_2/C_1| < 1.0 \times 10^{-1} \quad (5)$$

$$1.0 \times 10^{-8} < |C_3/C_1| < 1.0 \times 10^{-2} \quad (6)$$

In this case, coefficients $C_1$, $C_2$, and $C_3$ are the same coefficients in equation (d) given above. If the set coefficients fall outside the ranges defined by the above two conditional expressions ((5) and (6)), aberration correction is difficult to perform, and a diffractive optical element is difficult to form.

Figure 26:
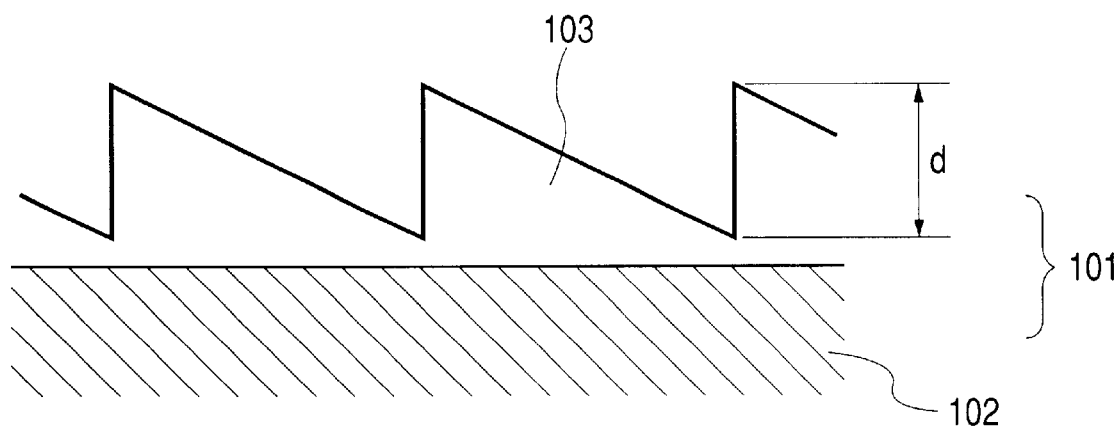
FIG. 26 is a partial enlarged sectional view of a diffractive optical element of a single-layer type.
Figure 27:
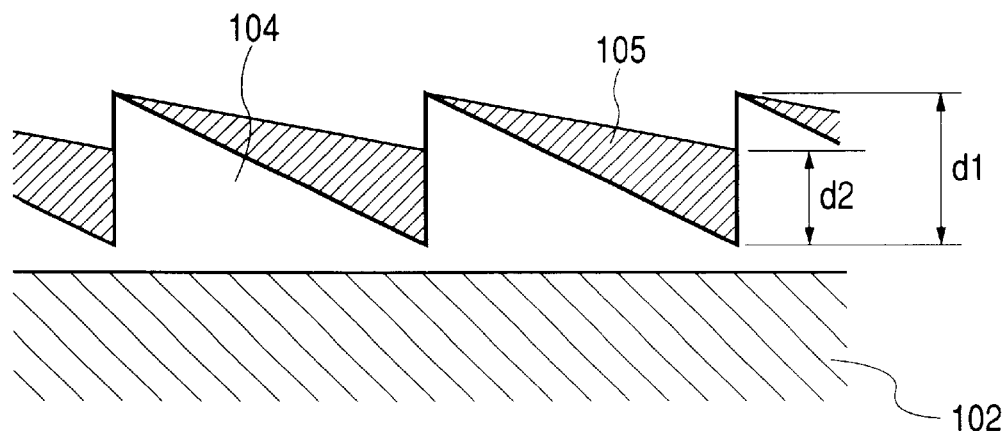
FIG. 27 is a partial enlarged sectional view of a diffractive optical element of a multilayer type.

The structure of the diffractive optical element used in this embodiment may be a single-layer structure formed by a single diffraction grating layer having a kinoform structure like the one shown in FIG. 26, a multilayer structure formed by stacking two diffraction grating layers having different thicknesses (or the same thickness) like those shown in FIG. 27, or the like.

Figure 28:
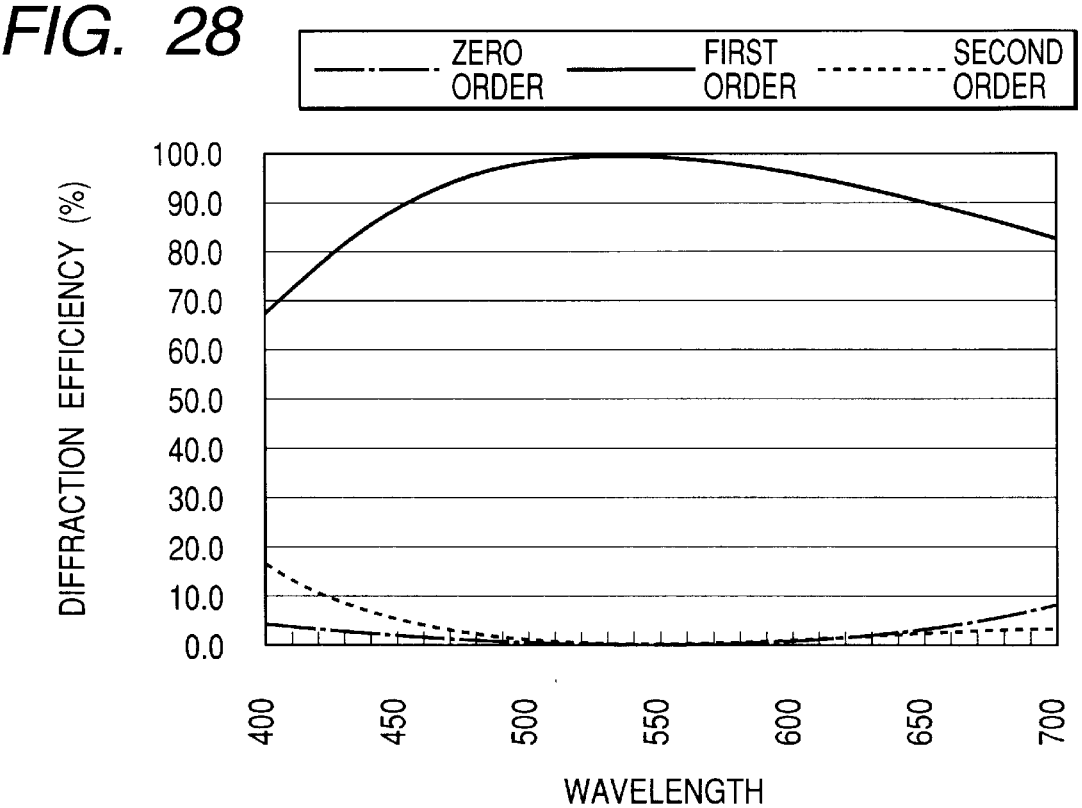
FIG. 28 is a graph for explaining the wavelength dependence characteristics of the diffractive optical element in FIG. 17.

FIG. 28 shows the wavelength dependence of the diffraction efficiency of first-order diffracted light in a diffractive optical element 101 shown in FIG. 26. As shown in FIG. 26, according to the actual structure of the diffractive optical element 101, the surface of a base 102 is coated with an ultraviolet curing resin, and a diffraction grating 103 having a grating thickness d is formed on the resin portion such that the diffraction efficiency of first-order diffracted light becomes 100% at a wavelength of 530 nm.

As is obvious from FIG. 28, the diffraction efficiency of first-order diffracted light, which is light with the design order, decreases as its wavelength differs from a wavelength of 530 nm at which the element is optimized. In contrast to this, the diffraction efficiencies of 0th-order diffracted light and second-order diffracted light, which are light beams with the orders near the design order, increase. An increase in diffracted light with orders other than the design order produces flare, resulting in a deterioration in the resolution of the optical system.

Figure 29:
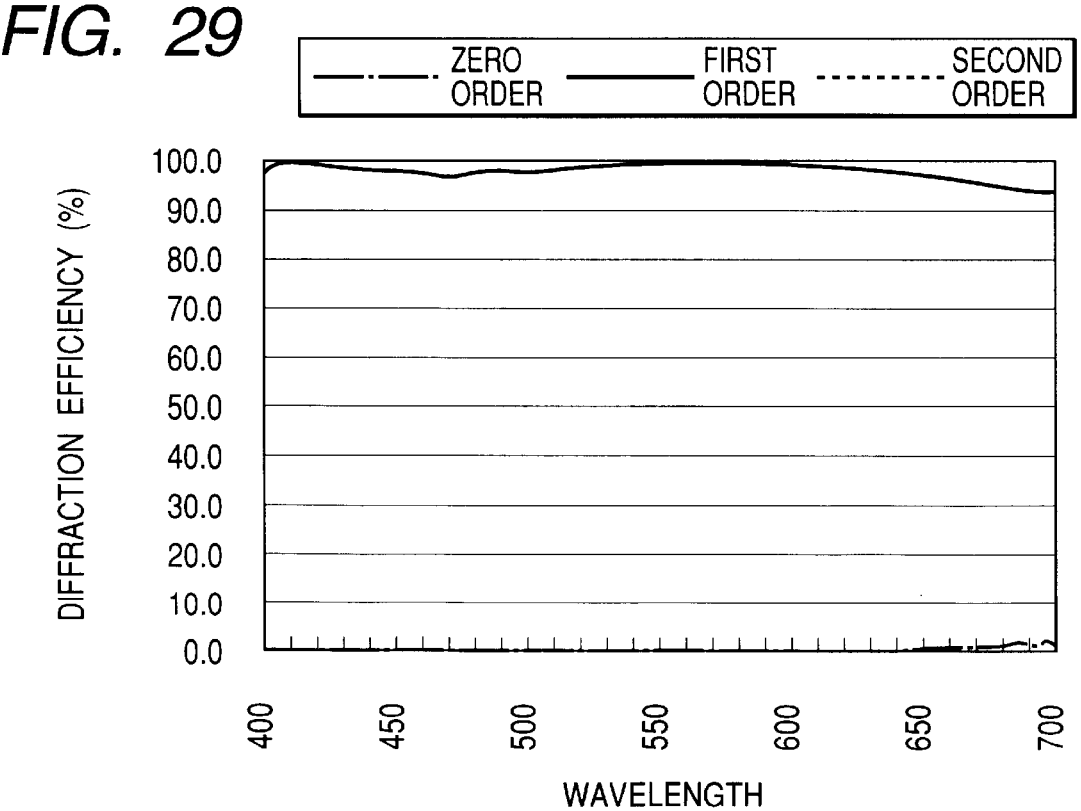
FIG. 29 is a graph for explaining the wavelength dependence characteristics of the diffractive optical element in FIG. 18.

FIG. 29 shows the wavelength dependence of a multilayer diffractive optical element having two diffraction gratings 104 and 105 stacked on each other in FIG. 27. Referring to FIG. 27, the first diffraction grating 104 made of an ultraviolet curing resin (nd=1.499, vd=54) is formed on a base 102, and the second diffraction grating 105 made of a different ultraviolet curing resin (nd=1.598, vd=28) is formed on the resultant structure. According this combination of materials, a grating thickness d1 of the first diffraction grating 104 is 13.8 $\mu$m, and a grating thickness d2 of the second diffraction grating 105 is 10.5 $\mu$m. As is apparent from FIG. 29, with this diffractive optical element having the multilayer structure, the diffraction efficiency of the design order is as high as 95% or more throughout the operating wavelength range.

As described above, the optical performance can be further improved by using a diffractive optical element having a multilayer structure.

Figure 30:
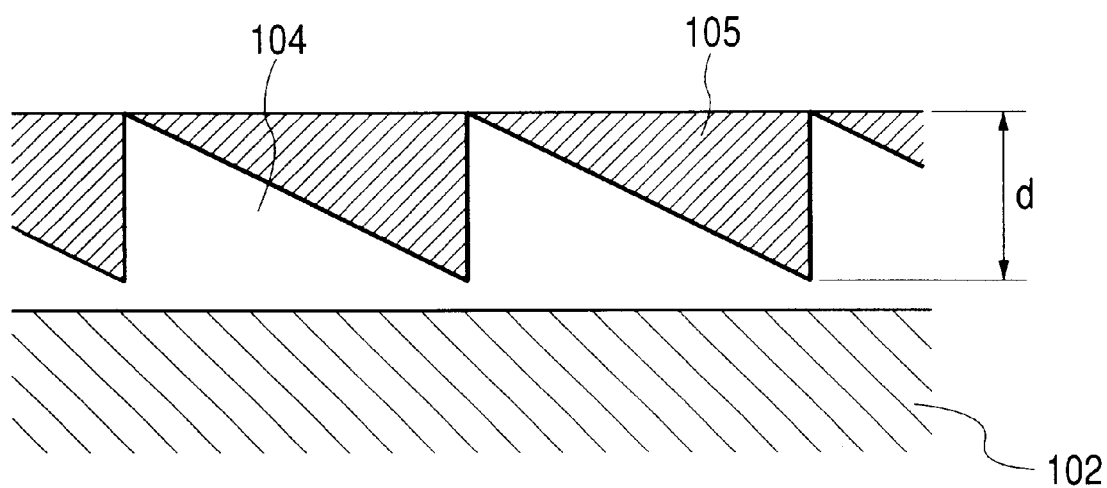
FIG. 30 is a partial enlarged sectional view of a diffractive optical element of a multilayer type.

The material for the diffractive optical element is not limited to an ultraviolet curing resin, and other materials such as a plastic material can be used. Depending on the base to be used, the first diffraction grating 104 may be directly formed on the base. Depending on a combination of materials, diffraction gratings need not have different grating thicknesses and may have the same thickness as shown in FIG. 30. In this case, since no stepped grating portions are formed on the optical element surface, excellent dust-proof performance can be obtained, and the assembily of the diffractive optical element can be improved, thus providing a more inexpensive optical system.

Figure 31:
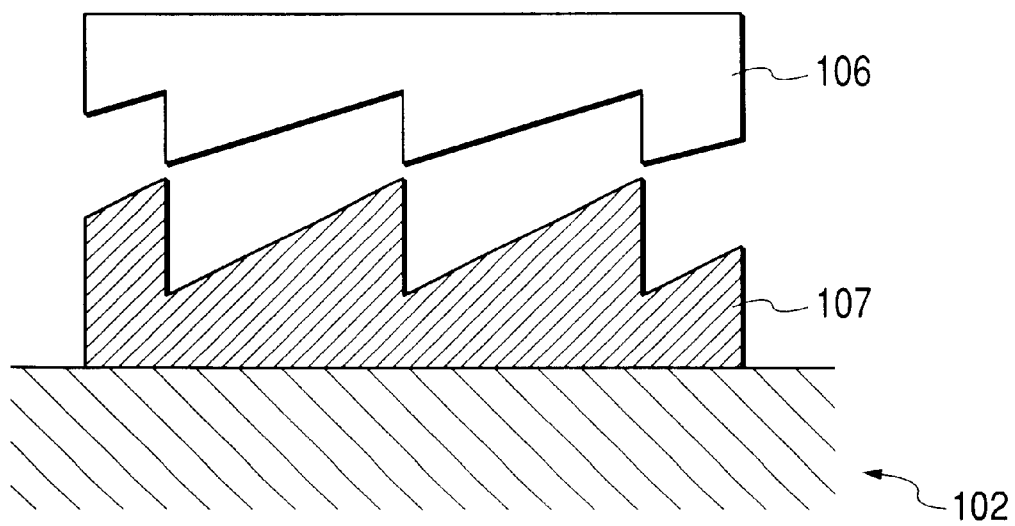
FIG. 31 is a partial enlarged sectional view of a diffractive optical element of a multilayer type.

FIG. 31 shows a diffractive optical element having a multilayer structure which is formed by forming a first diffraction grating 107 made of a curing resin (nd=1.6685, vd=19.7) on a base 102, and a second diffraction grating 106 made of a different ultraviolet curing resin (nd=1.5240, vd=50.8) is formed at a position where the edge of each sawtooth of the diffraction grating 106 is spaced apart from that of the diffraction grating 107 by a distance of about 1.5 $\mu$m. With this diffractive optical element, a diffraction efficiency similar to that of the diffractive optical element in FIG. 27 can be obtained. According to this combination of materials, a grating thickness d1 of the first diffraction grating 107 is 5.0 $\mu$m, and a grating thickness d2 of the second diffraction grating 106 is 7.5 $\mu$m.

In this embodiment, by using the diffractive optical element having the above structure, an optical system could be obtained, which could reduce chromatic aberration, could decrease the number of constituent lenses, and had excellent optical performance.

As described above, the number of constituent lenses is increased to reduce the aberration share of each lens unit so as to increase the degree of freedom. For this purpose, this zoom lens has six lens units as a whole. A diffractive optical element is properly set for a predetermined lens unit of these lens units to realize a zoom lens which can correct chromatic aberration (magnification chromatic aberration, in particular) and is suitable for a projection lens for enlarging/projecting a liquid crystal image or the like, used in a liquid crystal projector or the like designed to reduce the size of the overall lens system.

A zoom lens having a telecentric optical system is realized, in particular, which has sufficiently corrected various types of aberrations while ensuring a large aperture with a magnification ratio of 1.2 or more and Fno of about 2.0, and has properly corrected magnification chromatic aberration to have excellent performance throughout the entire zooming range/entire object distance while sufficiently ensuring a backfocus space in which optical elements such as a color combining prism and filters are arranged. In this case, the total lens length can also be reduced.

Note that the zoom lens according to the present invention can be suitably applied to various optical devices such as an optical system for image reading and an optical system for image recording.

The numerical data of the first to fourth numerical embodiments will be described below. In each numerical embodiment, let ri be the radius of curvature of the ith optical surface from the enlargement conjugate side (screen side), di be the thickness or air gap of the ith optical member from the enlargement conjugate side, and ni and vi be the refractive index and Abbe number, respectively, of the material for the ith optical member from the enlargement conjugate side.

The shape of each diffractive optical element is represented by equation (d) given above. Table 1 shows the correspondence between each conditional expression described above and the numerical embodiment.

First Numerical Embodiment f=28.70 to 34.15 fno=1:2.04 to 2.34 2$\omega$=47.07° to 40.21° r1=58.853 d1=3.45 n1=1.88761 v1=40.8
r2=−501.819 d2=0.15
r3=36.519 d3=1.50 n2=1.48898 v2=70.2
r4=16.443 d4=3.76
r5=202.078 d5=1.50 n3=1.48898 v3=70.2
r6=34.134 d6=0.96
r7=106.980 d7=1.50 n4=1.88761 v4=40.8
r8=43.452 d8=variable
r9=25.776 d9=2.61 n5=1.79098 v5=26.3
r10=−129.321 d10=0.93
r11=−38.710 d11=1.50 n6=1.85415 v6=23.8
r12=1219.482 d12=variable
r13=24.239 d13=2.45 n7=1.56583 v7=60.7
r14=−2587.970 d14=0.29
r15=(stop) d15=variable
r16=−57.578 d16=1.50 n8=1.73704 v8=51.5
r17=40.903 d17=variable
r18=−22.239 d18=1.50 n9=1.76787 v9=26.5
r19=39.088 d19=5.30 n10=1.60524 v10=60.6
r20=−25.129 d20=0.15
r21=−1207.754 d21=4.05 n11=1.88761 v11=40.8
*r22=−34.112 d22=variable r23=47.981 d23=3.77 n12=1.88761 v12=40.8
r24=−1446.018 d24=5.14
r25=∞ d25=41.50 n13=1.62528 v13=58.2
r26=∞

Diffraction Surface twenty-second surface
$c1=-3.24110\times10^{-4}$
$c2=2.41540\times10^{-7}$
$c3=5.97670\times10^{-10}$

|  | Focal Distance | | |
| --- | --- | --- | --- |
| Variable Range | 28.70 | 31.30 | 34.15 |
| d8 | 3.05 | 2.05 | 1.14 |
| d12 | 0.80 | 0.78 | 0.80 |
| d15 | 2.39 | 4.12 | 5.96 |
| d17 | 7.29 | 5.09 | 2.80 |
| d22 | 0.50 | 1.97 | 3.33 |

Second Numerical Embodiment f=34.14991 fno=1:2.04 to 2.34 2ω=47.07° to 40.21° r1=68.312 d1=3.25 n1=1.88761 v1=40.8
r2=−196.960 d2=0.15
r3=57.516 d3=1.50 n2=1.48898 v2=70.2
r4=17.788 d4=3.68
r5=−205.806 d5=1.50 n3=1.48898 v3=70.2
r6=35.915 d6=variable
r7=71.461 d7=2.14 n4=1.85415 v4=23.8
r8=−71.628 d8=0.97
r9=−30.249 d9=1.50 n5=1.85415 v5=23.8
r10=−185.579 d10=variable
r11=23.760 d11=2.68 n6=1.69369 v6=54.8
r12=−417.683 d12=0.3
r13=(stop) d13=variable
r14=−37.918 d14=1.50 n7=1.71582 v7=53.9
r15=48.560 d15=variable
r16=−41.883 d16=1.50 n8=1.79116 v8=25.7
r17=32.945 d17=5.27 n9=1.65347 v9=56.2
r18=−35.760 d18=0.15
r19=643.247 d19=3.82 n10=1.88761 v10=40.8
*r20=−41.473 d20=variable
r21=60.123 d21=3.76 n11=1.88761 v11=40.8
r22=−204.386 d22=5.14
r23=∞ d23=41.50 n12=1.62528 v12=58.2
r24=∞

Diffraction Surface twentieth surface
$c1=-3.62160\times10^{-4}$
$c2=4.34610\times10^{-7}$
$c3=6.74120\times10^{-10}$

|  | Focal Distance | | |
| --- | --- | --- | --- |
| Variable Range | 28.70 | 31.30 | 34.15 |
| d6 | 3.91 | 3.10 | 1.98 |
| d10 | 1.31 | 0.80 | 0.80 |
| d13 | 4.66 | 6.40 | 8.20 |
| d15 | 6.85 | 5.09 | 3.15 |
| d20 | 0.50 | 1.85 | 3.10 |

Third Numerical Embodiment f=34.14701 fno=1:2.04 to 2.34 2ω=47.07° to 40.21° r1=65.866 d1=3.15 n1=1.83876 v1=37.2
r2=−176.072 d2=0.15
r3=41.739 d3=1.50 n2=1.48898 v2=70.2
r4=16.154 d4=2.80
r5=236.204 d5=1.50 n3=1.48898 v3=70.2
r6=36.066 d6=variable
r7=308.317 d7=1.93 n4=1.85415 v4=23.8
r8=−51.886 d8=0.57
r9=−27.425 d9=1.50 n5=1.85415 v5=23.8
r10=−141.858 d10=variable
r11=22.020 d11=2.63 n6=1.72019 v6=47.9
r12=899.965 d12=0.33
r13=(stop) d13=variable
r14=−30.826 d14=1.50 n7=1.62261 v7=60.3
r15=41.800 d15=variable
r16=−58.854 d16=1.50 n8=1.85415 v8=23.8
r17=36.437 d17=4.88 n9=1.68052 v9=55.3
r18=−39.630 d18=0.15
r19=−2566.075 d19=3.44 n10=1.88761 v10=40.8
*r20=−42.942 d20=variable
r21=72.554 d21=3.85 n11=1.88761 v11=40.8
r22=−94.165 d22=5.14
r23=∞ d23=41.50 n12=1.62528 v12=58.2
r24=∞

Diffraction Surface twentieth surface
$c1=-3.76150\times10^{-4}$
$c2=3.76250\times10^{-7}$
$c3=1.03130\times10^{-9}$

|  | Focal Distance | | |
| --- | --- | --- | --- |
| Variable Range | 28.70 | 31.30 | 34.15 |
| d6 | 3.99 | 3.21 | 2.25 |
| d10 | 0.53 | 0.50 | 0.50 |
| d13 | 4.00 | 6.10 | 7.99 |
| d15 | 7.50 | 5.44 | 3.35 |
| d20 | 0.50 | 1.27 | 2.43 |

Fourth Numerical Embodiment f=34.14988 fno=1:2.04 to 2.34 2ω=47.07° to 40.21° r1=191.878 d=2.66 n1=1.80768 v1=46.6
r2=−115.943 d2=0.15
r3=84.429 d3=2.09 n2=1.76099 v2=27.5
r4=356.453 d4=0.15
r5=44.503 d5=1.50 n3=1.48898 v3=70.2
r6=14.456 d6=variable
r7=−21.815 d7=1.50 n4=1.58447 v4=40.8
r8=−68.834 d8=variable
r9=24.741 d9=2.65 n5=1.77582 v5=49.6 r10=−233.839 d10=0.30
r11=(stop) d11=variable
r12=−31.363 d12=1.50 n6=1.48898 v6=70.2
r13=33.754 d13=variable
r14=−81.904 d14=1.50 n7=1.85415 v7=23.8
r15=34.179 d15=4.79 n8=1.62261 v8=60.3
r16=−46.723 d16=0.15
r17=859.297 d17=3.50 n9=1.83897 v9=42.7
*r18=−45.988 d18=variable
r19=72.837 d19=4.38 n10=1.83897 v10=42.7
r20=−72.530 d20=5.14
r21=∞ d21=41.50 n11=1.62528 v11=58.2
r22=∞

Diffraction Surface eighteenth surface
$c1=-3.61700 \times 10^{-4}$
$c2=4.94330 \times 10^{-7}$
$c3=2.83840 \times 10^{-10}$

|                | Focal Distance | | |
| --- | --- | --- | --- |
| Variable Range | 28.70 | 31.30 | 34.15 |
| d6 | 7.70 | 7.34 | 7.02 |
| d8 | 1.18 | 0.89 | 0.50 |
| d11 | 3.14 | 5.69 | 8.20 |
| d13 | 8.58 | 6.04 | 3.55 |
| d18 | 0.50 | 1.13 | 1.83 |

TABLE 1

| Conditional Expression | Numerical Embodiment | | | |
| --- | --- | --- | --- | --- |
|  | 1 | 2 | 3 | 4 |
| (1) d4W/d4T | 2.60 | 2.17 | 2.24 | 2.42 |
| (2) d1W/d1T | 2.67 | 1.98 | 1.77 | 1.10 |
| (3) \|M2/M4\| | 1.15 | 1.77 | 0.78 | 0.18 |
| (4) \|M5/M4\| | 1.70 | 2.38 | 0.87 | 0.36 |
| (5) \|C$_2$/C$_1$\| | 7.54 × 10$^{-4}$ | 1.20 × 10$^{-3}$ | 1.00 × 10$^{-3}$ | 1.37 × 10$^{-3}$ |
| (6) \|C$_3$/C$_1$\| | 1.84 × 10$^{-6}$ | 1.86 × 10$^{-6}$ | 2.74 × 10$^{-6}$ | 7.85 × 10$^{-7}$ |

Zoom lenses according to the fifth to seventh numerical embodiments will be described next.

Figure 17:
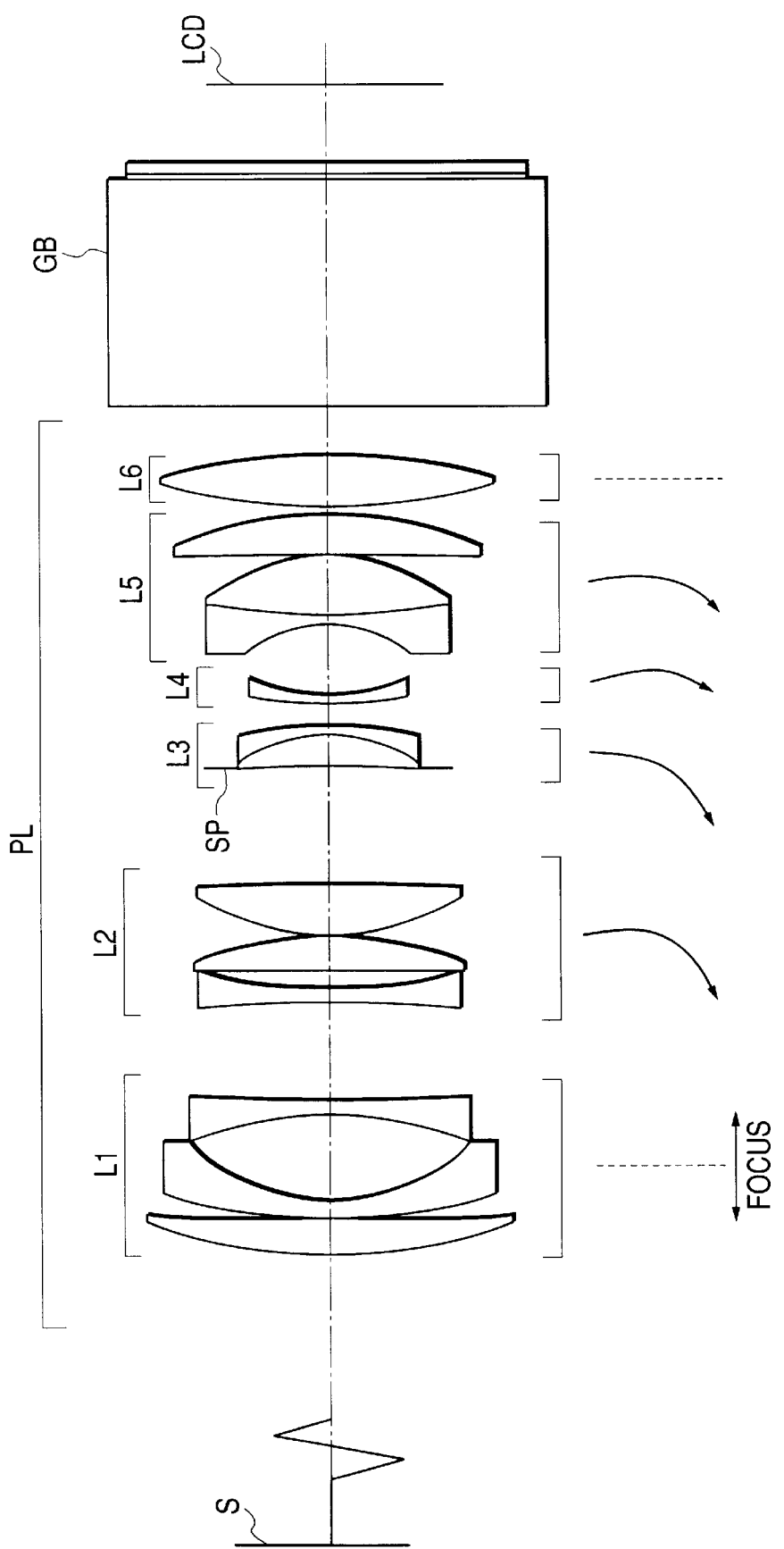
FIG. 17 is a sectional view of the lenses of a zoom lens system according to the fifth numerical embodiment.
Figure 20:
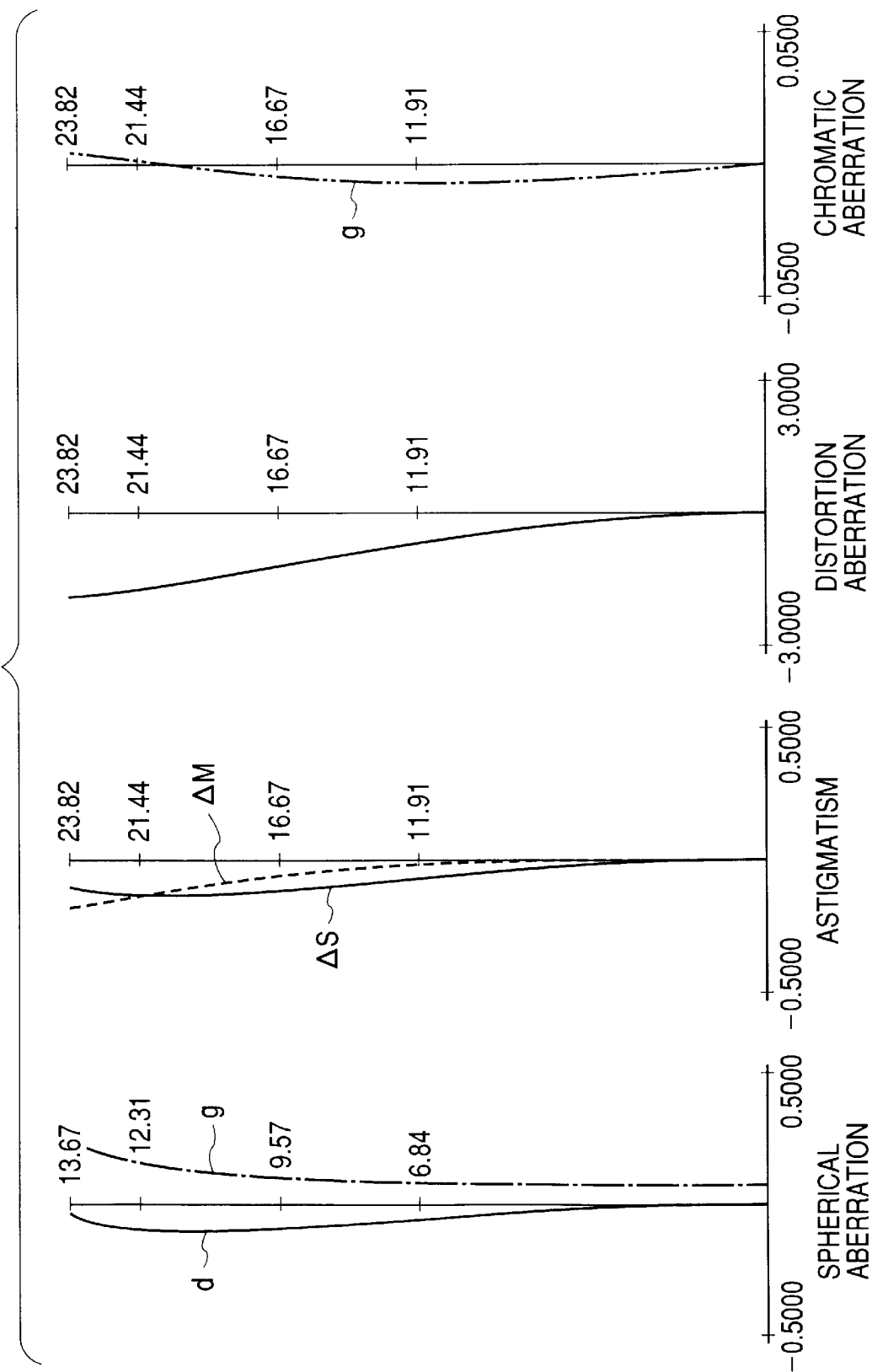
FIG. 20 is an aberration diagram of the zoom lens system according to the fifth numerical embodiment at the short focal length end.
Figure 21:
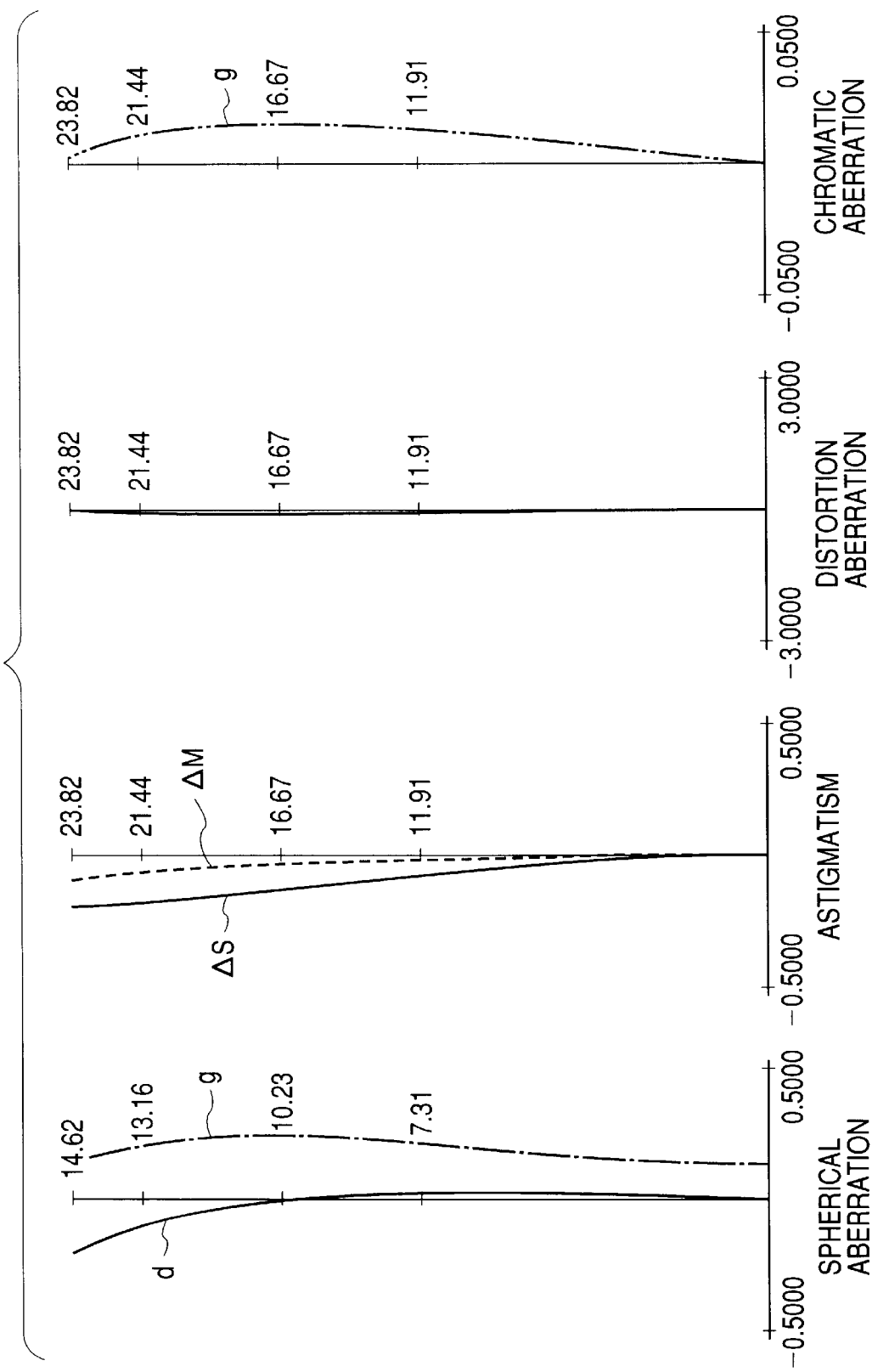
FIG. 21 is an aberration diagram of the zoom lens system according to the fifth numerical embodiment at the long focal length end.

FIG. 17 is a sectional view of the lenses of the zoom lens according to the fifth numerical embodiment. FIGS. 20 and 21 are aberration diagrams on original images at the wide-angle end and tele-photo end, obtained by reversely tracing a light beam from a screen at a distance of 2.5 m with numerical data (to be described later) being expressed in unit "mm".

Figure 18:
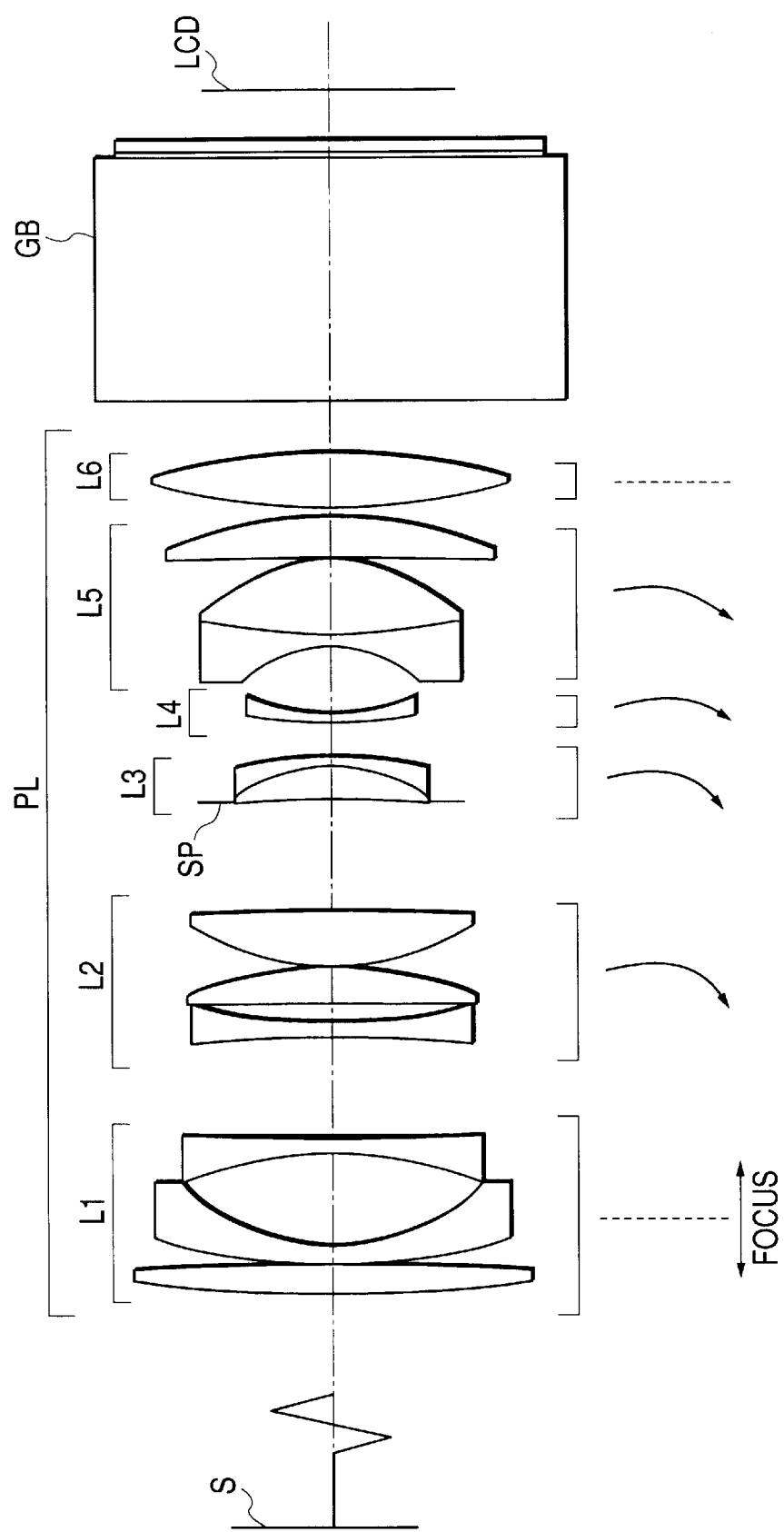
FIG. 18 is a sectional view of the lenses of a zoom lens system according to the sixth numerical embodiment.
Figure 22:
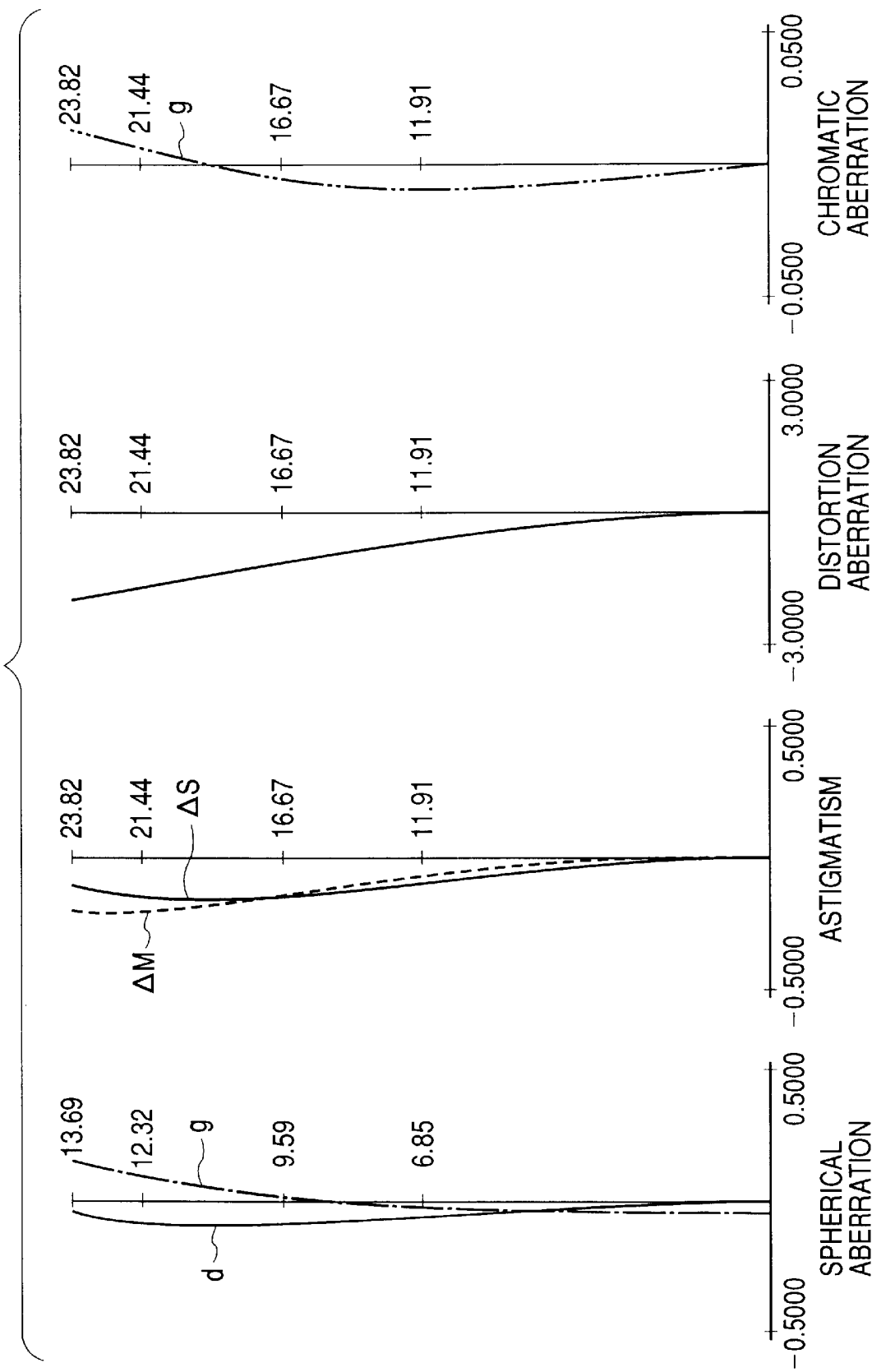
FIG. 22 is an aberration diagram of the zoom lens system according to the sixth numerical embodiment at the short focal length end.
Figure 23:
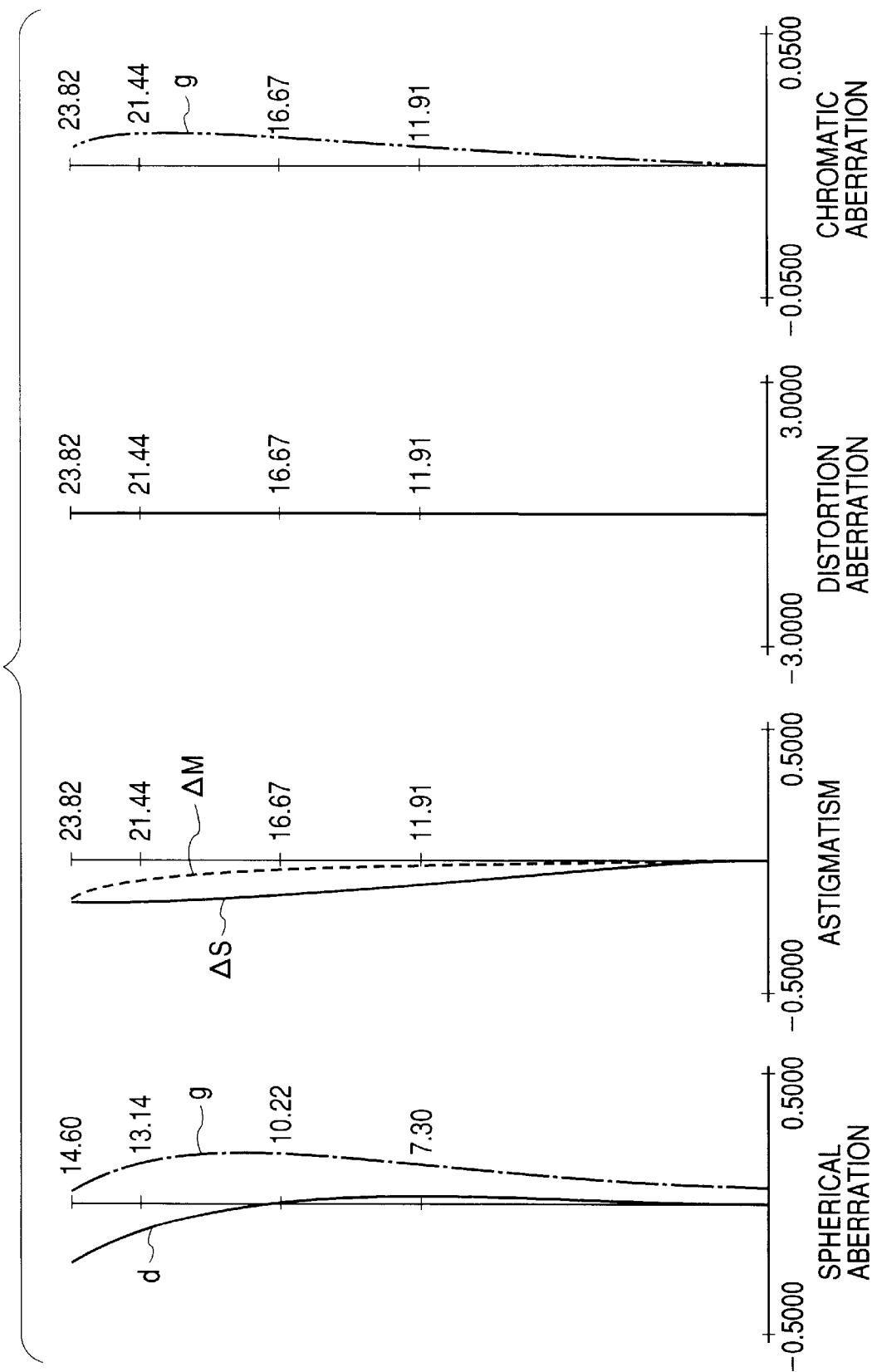
FIG. 23 is an aberration diagram of the zoom lens system according to the sixth numerical embodiment at the long focal length end.

FIG. 18 is a sectional view of the lenses of the zoom lens according to the sixth numerical embodiment. FIGS. 22 and 23 are aberration diagrams on original images at the wide-angle end and tele-photo end, obtained by reversely tracing a light beam from a screen at a distance of 2.5 m with numerical data (to be described later) being expressed in mm.

Figure 19:
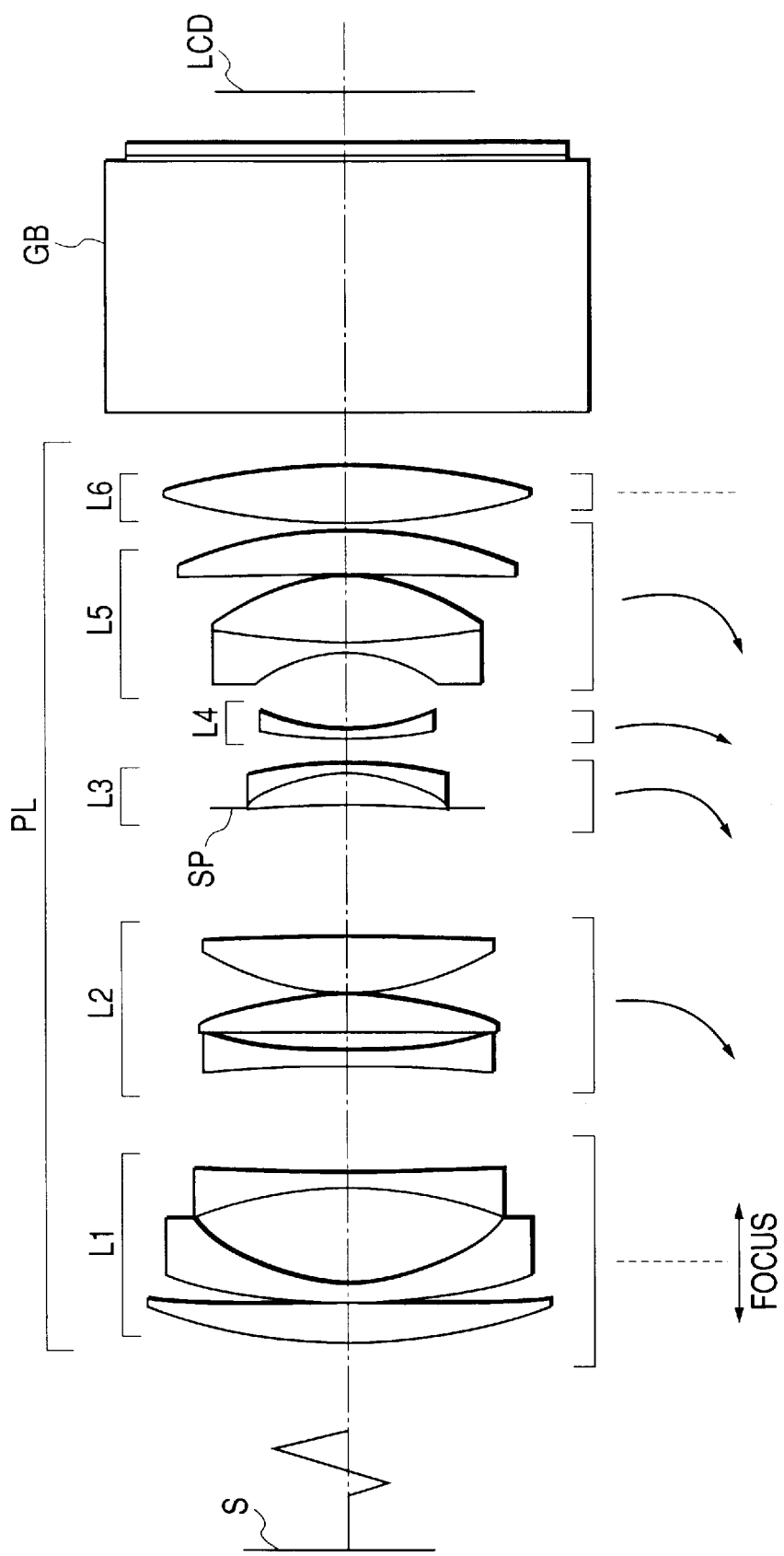
FIG. 19 is a sectional view of the lenses of a zoom lens system according to the seventh numerical embodiment.
Figure 24:
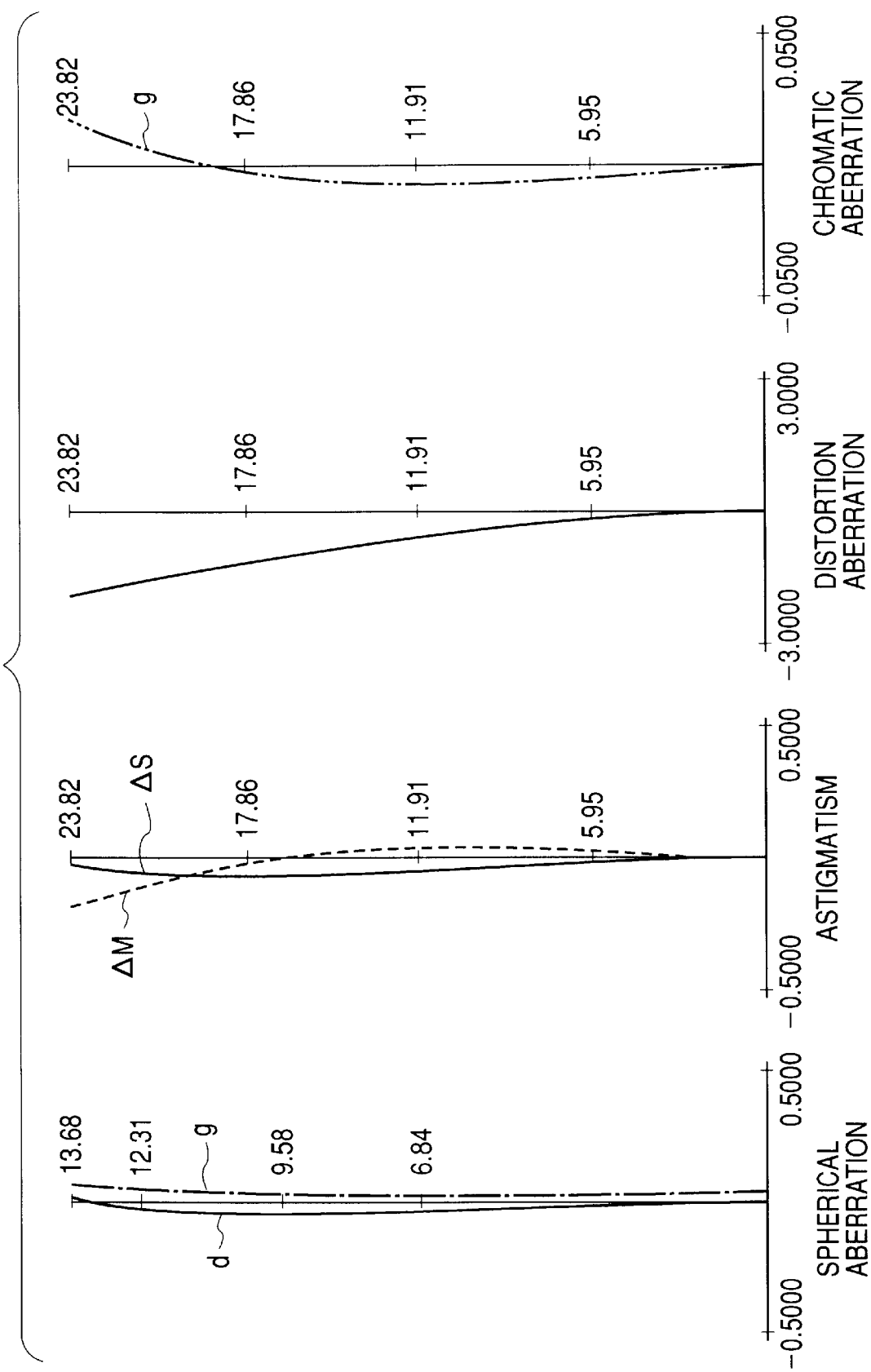
FIG. 24 is an aberration diagram of the zoom lens system according to the seventh numerical embodiment at the short focal length end.
Figure 25:
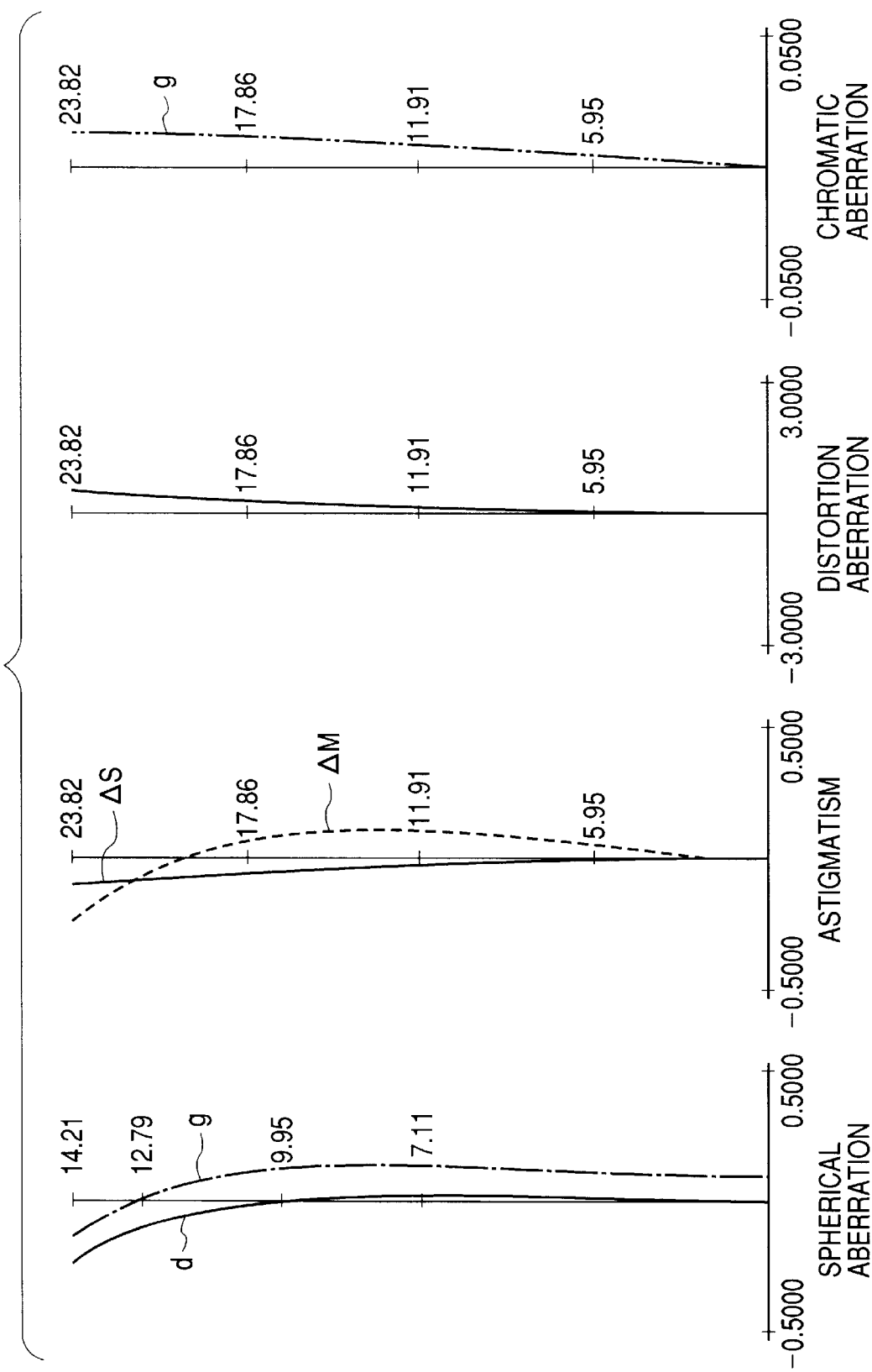
FIG. 25 is an aberration diagram of the zoom lens system according to the seventh numerical embodiment at the long focal length end.

FIG. 19 is a sectional view of the lenses of the zoom lens according to the seventh numerical embodiment. FIGS. 24 and 25 are aberration diagrams on original images at the wide-angle end and tele-photo end, obtained by reversely tracing a light beam from a screen at a distance of 2.5 m with numerical data (to be described later) being expressed in mm.

In each of the sectional views of the lenses of FIGS. 17 to 19, a zoom lens PL serves as a projection lens. This zoom lens includes a first unit (first lens unit) L1 having a negative optical power, a second unit (second lens unit) L2 having a positive optical power, a third unit (third lens unit) L3 having a weak positive optical power, a fourth unit (fourth lens unit) L4 having a negative optical power, a fifth unit (fifth lens unit) L5 having a positive optical power, and a sixth unit (sixth lens unit) L6 having a positive optical power. An aperture stop SP is included in the second or third unit and is moved together with one of these units in zooming.

FIG. 17 also shows a screen surface (projection surface) S and an original image LCD (projected surface) displayed on a liquid crystal panel (liquid crystal display device) or the like. The screen surface S is conjugate to the original image LCD. The screen surface S is placed at a conjugate point (first conjugate point) at a long distance, and the original image LCD is placed at a conjugate point (second conjugate point) at a short distance.

A glass block GB corresponds to a color combining prism, polarizing filter, color filter, or the like.

The zoom lens PL is mounted in a liquid crystal video projector main body through a connecting member (not shown). A liquid crystal display device and the like located after the glass block GB are housed in the projector main body.

The zoom lens PL according to this embodiment is formed by a substantially telecentric lens system for enlarging/projecting the image LCD on the display surface onto the screen S.

In this embodiment, focusing is performed by moving the first unit along the optical axis. Note that focusing may be performed by simultaneously moving the first and second units or moving third unit, fifth unit, or all units. Alternatively, focusing may be performed by moving the display panel.

In this embodiment, the first and sixth lens units L1 and L6 are fixed during zooming, and at least three lens units of the remaining lens units are movable. This makes it possible to prevent a deterioration in optical performance in brightning the F-number and properly correct spherical aberration, in particular, while maintaining the size of the overall optical system equal to or smaller than that of a conventional optical system.

Since the first and sixth lens units L1 and L6 are fixed during zooming, a change in weight balance is small. In addition, since the moving units are not exposed, the zoom lens is robust.

Note that an aspherical surface may be introduced into the optical system to attain a reduction in size and an improvement in performance. This aspherical surface may be a glass mold type, replica aspherical surface type, polished aspherical surface lens, or the like. If an aspherical surface is to be introduced as a low-sensitivity surface, this surface may be plastic aspherical surface lens.

In addition, the positive lens having a strong convex surface on the object side, which is located nearest to the object side, properly corrects spherical aberration and distortion aberration.

In order to attain a reduction in size with a simple lens structure, effectively perform zooming with small moving amounts of variable-power lens units, and suppress the occurrence/variation of chromatic aberration, the respective lens units are preferably moved such that the distance between the third and fourth lens units L3 and L4 and the distance between the fifth and sixth lens units L5 and L6 at the focal length on the tele-photo end become larger than those at the focal length on the wide-angle end.

In this case, the second lens unit L2 serves as a main variable-power lens unit, and zooming is performed when this lens unit moves. When the fourth lens unit L4 moves with this movement, variations in the imaging position that moves during zooming are corrected.

Alternatively, the second, fourth, and fifth lens units L2, L4, and L5 may be moved toward the screen side at different speeds in zooming, and the third lens unit L3 may be moved to correct variations in the imaging position that moves during zooming.

Alternatively, zooming may be performed by only the second, fourth, and fifth lens units L2, L4, and L5 while the third lens unit L3 is fixed during zooming.

In order to realize a simple arrangement, it is preferable that the second lens unit L2 serving as a main variable-power lens unit be comprised of at least one positive lens and one negative lens, the third lens unit L3 be formed by at least one positive lens, and the fourth lens unit L4 be formed by at least one negative lens.

The sixth lens unit L6 is located nearest to the original image side and provided with a relatively strong positive optical power to realize a telecentric system. The fifth lens unit L5 is preferably formed by one positive lens having a convex surface facing the screen side to realize both correction of off-axis curvature of field and simplification of the arrangement.

By moving the second and fifth lens units L2 and L5 in the same direction in zooming, a zoom lens with a high magnification ratio can be realized while the moving amounts and spaces of the respective lens units are reduced. This makes it possible to decrease the total length, prevent variations in total length in zooming, decrease the distance from the incident pupil position to the front element, and decrease the front-element diameter determined by an off-axis oblique light beam.

The first lens unit L1 has a negative optical power and ensures a long backfocus for the space of a color combining element. To increase the backfocus, in particular, a negative meniscus lens having a convex surface facing the screen side is preferably provided for the first lens unit L1.

In addition, by properly setting optical powers for the respective lens units and fixing the first lens unit L1 during zooming, a lens system can be realized, which reduces variations in the position of an off-axis oblique light beam, attains simplification of the arrangement, and has a constant total length.

To reduce distortion at the wide-angle end, a convex lens is preferably placed in the first lens unit L1 at a position nearest to the object side so as to correct distortion at a position where off-axis light beams pass most. It is especially preferable that this convex lens be a positive lens having a convex surface facing the screen side.

It is also preferable to provide an aspherical surface for the optical system to correct spherical aberration and distortion aberration.

The zoom lens of the fifth numerical embodiment shown in FIG. 17 is comprised of six lens units respectively having a negative optical power, a positive optical power, a positive optical power, a negative optical power, a positive optical power, and a positive optical power sequentially arranged from the screen side. In zooming from the wide-angle end to the tele-photo end, the first and sixth lens units L1 and L6 are fixed to keep the total length constant, and the second, third, fourth, and fifth lens units L2, L3, L4, and L5 are independently moved to the screen S side. In this case, the second and fourth lens units L2 and L4 serve to increase the magnification, whereas the third and fifth lens units L3 and L5 serve to decrease the magnification in the entire zooming range. A diffractive optical element is provided for the sixth lens unit L6 to mainly correct magnification chromatic aberration. Focusing is performed by using the first lens unit L1.

The second lens unit L2 serves as a main variable-power lens unit and is provided with a large optical power. For this reason, a glass material with a high refractive index is preferably used for the convex lens (positive lens) to reduce the Petzval's sum. The use of this material is also preferable because variations in spherical aberration due to zooming can be reduced.

In the zoom lens according to the fifth numerical embodiment, the distortion aberration caused in the first lens unit L1 is corrected by the second lens unit L2. In addition, an aperture stop SP is placed in the third lens unit L3 on the screen side and moved together with the third lens unit L3, thus suppressing variations in off-axis aberration during zooming.

The fourth lens unit L4 has a negative optical power and serves to correct the movement of a focusing surface (image plane) with zooming.

The fifth lens unit L5 has a positive optical power. In this lens unit, a negative lens having a stronger negative optical power on the screen side than on the original image side is placed nearest to the screen side. This negative lens serves to efficiently reduce the Petzval's sum. In addition, the lens unit controls the principal point position on the original image side, ensures good telecentricity, and obtains a necessary backfocus length.

Even if the fifth lens unit L5 has a negative optical power, the object of the present invention can be achieved by satisfying conditional expression (23) to be described later.

The diffractive optical element provided for the sixth lens unit L6 is a diffraction grating for providing the phase expressed by equation (d) given above. With this diffractive optical element placed in the sixth lens unit L6, the magnification chromatic aberration caused in each lens unit can be suppressed small, and variations in magnification chromatic aberration due to the movement of the second lens unit L2 can also be suppressed small.

The zoom lens of the sixth numerical embodiment shown in FIG. 18 is comprised of six lens units respectively having a negative optical power, a positive optical power, a positive optical power, a negative optical power, a positive optical power, and a positive optical power sequentially arranged from the screen side. In zooming from the wide-angle end to the tele-photo end, the first and sixth lens units L1 and L6 are fixed to keep the total length constant, and the second, third, fourth, and fifth lens units L2, L3, L4, and L5 are independently moved to the screen S side. In this case, the second and fourth lens units L2 and L4 serve to increase the magnification, whereas the third and fifth lens units L3 and L5 serve to decrease the magnification in the entire zooming range. A diffractive optical element is provided for the second lens unit L2 to mainly correct magnification chromatic aberration. Focusing is performed by using the first lens unit L1.

The second lens unit L2 serves as a main variable-power lens unit and is provided with a large optical power. For this reason, a glass material with a high refractive index is preferably used for the convex lens (positive lens) to reduce the Petzval's sum. The use of this material is also preferable because variations in spherical aberration due to zooming can be reduced.

The distortion aberration caused in the first lens unit L1 is corrected by the second lens unit L2. In addition, an aperture stop SP is placed in the third lens unit L3 on the screen side and moved together with the third lens unit L3, thus suppressing variations in off-axis aberration during zooming.

The fourth lens unit L4 has a negative optical power and serves to correct the movement of a focusing surface with zooming.

The fifth lens unit L5 has a positive optical power. In this lens unit, a negative lens having a stronger negative optical power on the screen side than on the original image side is placed nearest to the screen side. This negative lens serves to efficiently reduce the Petzval's sum. In addition, the lens unit controls the principal point position on the original image side, ensures good telecentricity, and obtains a necessary backfocus length.

The diffractive optical element is a diffraction grating having the phase expressed by equation (d) given above.

As described above, magnification chromatic aberration caused in each lens unit is suppressed small by the diffractive optical element placed in the second lens unit L2, and variations in magnification chromatic aberration due to the movement of second lens unit L2 are also suppressed small.

The zoom lens of the seventh numerical embodiment shown in FIG. 19 is comprised of six lens units respectively having a negative optical power, a positive optical power, a positive optical power, a negative optical power, a positive optical power, and a positive optical power sequentially arranged from the screen side. In zooming from the wide-angle end to the tele-photo end, the first and sixth lens units L1 and L6 are fixed to keep the total length constant, and the second, third, fourth, and fifth lens units L2, L3, L4, and L5 are independently moved to the screen S side. In this case, the second and fourth lens units L2 and L4 serve to increase the magnification, whereas the third and fifth lens units L3 and L5 serve to decrease the magnification in the entire zooming range. A diffractive optical element is provided for the fifth lens unit L5 to mainly correct magnification chromatic aberration. Focusing is performed by using the first lens unit L1.

The second lens unit L2 serves as a main variable-power lens unit and is provided with a large optical power. For this reason, a glass material with a high refractive index is preferably used for the convex lens (positive lens) to reduce the Petzval's sum. The use of this material is also preferable because variations in spherical aberration due to zooming can be reduced.

The distortion aberration caused in the first lens unit L1 is corrected by the second lens unit L2. In addition, an aperture stop SP is placed in the third lens unit L3 on the screen side and moved together with the third lens unit L3, thus suppressing variations in off-axis aberration during zooming.

The fourth lens unit L4 has a negative optical power and serves to correct the movement of a focusing surface with zooming.

The fifth lens unit L5 has a positive optical power. In this lens unit, a negative lens having a stronger negative optical power on the screen side than on the original image side is placed nearest to the screen side. This negative lens serves to efficiently reduce the Petzval's sum. In addition, the lens unit controls the principal point position on the original image side, ensures good telecentricity, and obtains a necessary backfocus length.

The diffractive optical element is a diffraction grating having the phase expressed by equation (d) given above.

As described above, magnification chromatic aberration caused in each lens unit is suppressed small by the diffractive optical element placed in the fifth lens unit L5, and variations in magnification chromatic aberration due to the movement of second lens unit L2 are also suppressed small.

In each of the zoom lenses according to the fifth to seventh numerical embodiments, in order to further reduce aberration variations throughout the entire zooming range while ensuring a predetermined magnification ratio, and to obtain high optical performance throughout the entire screen, it is preferable to satisfy at least one of the following conditions. Note that when two or more conditions are to be satisfied, an arbitrary combination may be selected.

(B-1) Letting $\phi 2$ be the optical power of the second lens unit L2, and $\phi w$ be the optical power of the overall system at the wide-angle end, it is preferable to satisfy $$0<\phi 2/\phi w<1.5 \tag{7}$$

Expression (7) defines the optical power of the second lens unit L2 that contributes most to zooming. Below the lower limit defined by conditional expression (7), the total lens length undesirably increases to make it impossible to realize a compact structure. Beyond the upper limit defined by conditional expression (7), although the corresponding arrangement is advantageous for a reduction in size, aberration variations during zooming become undesirably large.

(B-2) The first lens unit L1 preferably has a positive lens located nearest to the screen side and having a convex surface having a stronger optical power on the screen side than on the original image side.

(B-3) Letting $v1p$ be the smallest Abbe number of the Abbe numbers of the positive lenses arranged in the first lens unit L1, and $v1n$ be the largest Abbe number of the Abbe numbers of the negative lenses arranged in this lens unit, the first lens unit L1 preferably satisfies $$v1n-v1p>10 \tag{8}$$

Expression (8) is a conditional expression for suppressing the chromatic aberration caused in the first lens unit L1 exhibiting the greatest off-axis light beam height in the optical system. In this case, the pupil (aperture stop) of this lens system is preferably located near the second or third lens unit L2 or L3. More specifically, this pupil is preferably matched with the surface of the second lens unit L2 which is located nearest to the screen side or the original image side, or the surface of the third lens unit L3 which is located nearest to the screen side or the original image side. If the second or third lens unit L2 or L3 is comprised of a plurality of lenses, the pupil may be located inside the lens unit. This arrangement prevents an off-axis light beam passing through the first lens unit L1 from excessively separating from the optical axis and has a good effect on the occurrence of magnification chromatic aberration. In addition, the arrangement can decrease the effective diameter of the first lens unit L1, and hence can realize a zoom lens having a compact, simple arrangement.

(B-4) Letting $\phi 23w$ be the synthetic optical power of the second and third lens units L2 and L3, and $\phi w$ be the optical power of the overall system at the wide-angle end, it is preferable to satisfy $$0<\phi 23w/\phi w<1.5 \tag{9}$$

Expression (9) defines the magnification of the variable-power lens unit at the wide-angle end. Below the lower limit defined by conditional expression (9), the total lens length undesirably increases to make it impossible to realize a compact structure. Beyond the upper limit defined by conditional expression (9), although the corresponding arrangement is advantageous for a reduction in size, aberration variations during zooming become undesirably large.

(B-5) Letting $\phi 4w$ be the optical power of the fourth lens unit L4, and $\phi w$ be the optical power of the overall system at the wide-angle end, it is preferable to satisfy $$0<|\phi 4w/\phi w|<1.5 \tag{10}$$

Expression (10) defines the magnification of the image plane position correction (compensator) unit at the wide-angle end. Below the lower limit defined by conditional expression (10), the optical power of the fourth lens unit L4 decreases, and the Petzval's sum increases as third-order aberration coefficient in the positive direction, resulting in an increase in curvature of image field. In addition, it is difficult to obtain a desired backfocus. Furthermore, the moving amount of the fourth lens unit L4 for image plane position correction in zooming increases, and variations in aberration caused during zooming undesirably increase. Beyond the upper limit defined by conditional expression (10), the optical power of the fourth lens unit L4 increases, the backfocus becomes unnecessarily increase. This makes it difficult to realize a compact structure.

(B-6) Letting $\nu 2p$ be the largest Abbe number of the Abbe numbers of the positive lenses of the second lens unit L2 constituted by one or more positive lens and one or more negative lenses, and $\nu 2n$ be the smallest Abbe number of the Abbe numbers of the negative lenses, it is preferable to satisfy $$\nu 2p - \nu 2n > 10 \tag{11}$$

Expression (11) serves a condition to suppress chromatic aberration caused in the second lens unit L2 and also cancel the residual magnification chromatic aberration caused in the first lens unit L1 which could not be corrected.

(B-7) The second or third lens unit L2 or L3 preferably has an aperture stop SP that moves together in zooming.

The pupil (aperture stop) of this lens system is preferably located near the second or third lens unit L2 or L3. More specifically, this pupil is preferably matched with the surface of the second lens unit L2 which is located nearest to the screen side or the original image side, or the surface of the third lens unit L3 which is located nearest to the screen side or the original image side. If the second or third lens unit L2 or L3 is comprised of a plurality of lenses, the pupil may be located inside the lens unit. This arrangement prevents an off-axis light beam passing through the first and second lens units L1 and L2 from excessively separating from the optical axis and has a good effect on the occurrence of magnification chromatic aberration. In addition, the arrangement can decrease the effective diameter of the first lens unit L1, and hence can realize a zoom lens having a compact and simple arrangement.

The aperture stop SP may move independently of the lens units in zooming. This makes it possible to properly suppress variations in aberration with zooming. The aperture stop SP may be moved together with the second or third lens unit L2 or L3. This makes it possible to realize a simple lens barrel structure.

(B-8) Letting $\phi 6w$ be the optical power of the sixth lens unit L6, and $\phi w$ be the optical power of the overall system at the wide-angle end, it is preferable to satisfy $$0<\phi 6w/\phi w<1.5 \tag{12}$$

Expression (12) defines the optical power of the sixth lens unit L6. The sixth lens unit L6 is placed near the original image side to decrease the synthetic optical power of the first to fifth lens units L1 to L5 and have an advantageous effect on increases in field angle and aperture.

Below the lower limit defined by conditional expression (12), the optical power of the sixth lens unit L6 excessively increases, resulting in increases in distortion aberration and internal coma flare. Beyond the upper limit defined by conditional expression (12), the optical power of the sixth lens unit L6 excessively decreases, and the effect of weakening the synthetic optical power of the first to fifth lens units L1 to L5 decreases, thus exerting a disadvantageous effect on increases in field angle and aperture.

(B-9) Letting fw be the focal length of the overall system at wide-angle end, and tk be the shortest distance in absolute value from the final lens surface to the exit pupil (pupil when viewed from the original image side) in the entire zooming range, it is preferable to satisfy $$|tk|/fw>1.5 \tag{13}$$

To eliminate the influence of the luminous intensity distribution characteristics of a liquid crystal device serving as a display panel for displaying an original image or the influence of the angle dependence of a color combining dichroic mirror film for combining a plurality of color light beams, the formation of a so-called telecentric optical system is effective, in which the pupil on the original image side (exit pupil) is located at a long distance. More specifically, it is preferable to satisfy conditional expression (13).

(B-10) Letting bf be the backfocus (the converted air distance from the lens surface nearest to the original image side to the original image), and fw be the focal length of the overall system at the wide-angle end, it is preferable to satisfy $$0.9<bf/fw \tag{14}$$

If this zoom lens is used as a projection lens for a color liquid crystal projection TV, a long backfocus is required because of the necessity to place a dichroic mirror and the like on the original image side. In addition, the optical power of the overall projection lens system is set to be very high to achieve a very short projection distance. Conditional expression (14) is designed to satisfy these two conditions.

(B-11) Letting $\nu 6p$ be the Abbe number of the material for an arbitrary positive lens of the sixth lens unit L6, it is preferable to satisfy $$\nu 6p>30 \tag{15}$$

In the sixth lens unit L6 which is located nearest to the original image and lets an off-axis light beam pass through the most peripheral side of the lens among the lens units other than the first lens unit L1, it is not preferable that the telecentric relationship is broken by wavelength. For this reason, letting $\nu 6p$ be the Abbe number of the material for an arbitrary positive lens of the sixth lens unit L6, at least one positive lens of the sixth lens unit L6 preferably satisfies conditional expression (15).

(B-12) If the sixth lens unit L6 is formed by one positive lens, and the Abbe number of the material for the positive lens is represented by $\nu 6p$, it is preferable to satisfy $$\nu 6p>35 \tag{16}$$

Conditional expression (16) has the same technical meaning as that of conditional expression (15).

(B-13) Letting fw be the focal length of the overall system at the wide-angle end, ft be the focal length of the overall system at the tele-photo end, and fi be the focal length of the ith lens unit, it is preferable to satisfy $$1.1<|f1/f2|<2.3 \quad (17)$$

$$0.5<f2/\sqrt{(fw \times ft)}<1.5 \quad (18)$$

The expressions given above properly define the relationship between the second lens unit L2 serving as a main variable-power unit and the first lens unit L1.

Below the lower limit defined by conditional expression (17), the front-element diameter determined by the first lens unit L1 undesirably increases, and the distortion aberration at the wide-angle end undesirably increases. Beyond the upper limit, the moving amount of second lens unit L2 must be increased to obtain a desired magnification ratio, resulting in an increase in the size of the overall system.

Expression (18) is designed to optimize the optical power of the main variable-power unit. Below the lower limit defined by expression (18), an image plane is overcorrected. Beyond the upper limit, the moving amount of second lens unit L2 must be increased to obtain a desired magnification ratio, resulting in an increase in the size of the overall system.

(B-14) Letting f1 be the focal length of the first lens unit L1, and fw be the focal length of the overall system at the wide-angle end, it is preferable to satisfy $$1<|f1|/fw<2.5 \quad (19)$$

Conditional expression (19) is mainly designed to properly correct distortion. Beyond the upper limited defined by conditional expression (19), the distortion at the wide-angle end cannot be properly corrected. Below the lower limit, the distortion at the tele-photo end cannot be properly corrected.

(B-15) Letting $\beta 2w$ and $\beta 2t$ be the lateral magnifications of the second lens unit L2 at the wide-angle end and tele-photo end, respectively, fw and ft be the focal lengths of the overall system at the wide-angle end and tele-photo end, respectively, Z2 be a change $\beta 2t/\beta 2w$ in the lateral magnification $\beta 2$ of the second lens unit L2 in zooming, Z be a change ft/fw in the focal length of the overall system, and M2 and M5 be the moving amounts of the second lens unit L2 and fifth lens unit L5, respectively, it is preferable to satisfy $$0.8<Z2/i\,Z<1.1 \quad (20)$$

$$1.0<|M2/M5|<11.0 \quad (21)$$

$$0.4<M2/(ft-fw)<1.3 \quad (22)$$

Expression (20) properly defines the magnification ratio of the second and fourth lens units L2 and L4. The third lens unit L3 preferably falls within this range because the magnification of the lens unit decreases in zooming. Outside this range, a lens system having a desired magnification ratio undesirably increases in size.

Expressions (21) and (22) are designed to optimize the length of the overall lens and the moving amount of each variable-power unit. The optical power of the fifth lens unit L5 tends to be lower than that of the second lens unit L2. In order to properly share magnification, this range is preferable. It is especially preferable that the moving amount of the second lens unit L2 exceed the moving amount of the fifth lens unit L5.

(B-16) Letting fi be the focal length of the ith lens unit, it is preferable to satisfy $$0.01<|f2/f5|<0.9 \quad (23)$$

Expression (23) is mainly designed to properly set a Petzval's sum by optimizing the power arrangement of and magnification of the main variable-power unit.

(B-17) Letting bf be the backfocus, and fi be the focal length of the ith lens unit, it is preferable to satisfy $$0.3<bf/f6<2.5 \quad (24)$$

$$0.9<|f1|/bf<1.6 \quad (25)$$

Conditional expressions (24) and (25) are designed to properly set the exit pupil and distortion of the overall system. The backfocus bf is the converted air distance from the sixth lens unit L6 to the original image.

Expression (24) is designed to properly make the overall system telecentric. This is conditional expression for letting a light beam vertically emerging from the original image be incident the fifth lens unit L5 and refracted thereby so as to efficiently reach the pupil (aperture stop) and for optimizing the effective diameter near the front element (first lens unit). Beyond the upper limit defined by this expression, the size of the system increases. Below the lower limit, distortion occurs.

Expression (25) is also a condition for making the system telecentric by setting a long exit pupil while properly setting distortion. Beyond the upper limit defined by this expression, the diameter of the first lens unit L1 undesirably increases. Below the lower limit, distortion undesirably increases at the wide-angle end.

(B-18) Letting f6 be the focal length of the sixth lens unit L6, and fw be the focal length of the overall system at the wide-angle end, it is preferable to satisfy $$0.5<f6/fw<3.5 \quad (26)$$

Conditional expression (26) is designed to optimize the distance from the sixth lens unit L6 to the original image while maintaining an optimal telecentric system. Beyond the lower limited defined by conditional expression (26), optimal telecentricity cannot be satisfied. Beyond the upper limit, the size of the system undesirably increases.

(B-19) letting fi be the focal length of the ith lens unit, and fw and ft be the focal lengths of the overall system at the wide-angle end and tele-photo end, it is preferable to satisfy $$0.7<|f1|/\sqrt{(fw \times ft)}<2.1 \quad (27)$$

$$0.6l<|f4|/\sqrt{(fw \times ft)}<20.0 \quad (28)$$

$$0.1<|f5|/\sqrt{(fw \times ft)}<10.0 \quad (29)$$

$$0.5<f6/\sqrt{(fw \times ft)}<3.0 \quad (30)$$

These conditional expressions are mainly designed to decrease the size of the overall optical system by optimizing the power arrangement of each lens unit and optimizing the moving amount of each lens unit.

Expression (27) is designed to sufficiently suppress distortion aberration in the first lens unit L1 and also ensure a sufficient backfocus. Beyond the upper limit value defined by expression (27), the moving amount for focusing increases to undesirably increase the total length, and the backfocus is undesirably decreased. Below the lower limit, although the moving amount for focusing decreases, distortion aberration is difficult to correct. In addition, since the negative value of the Petzval's sum increases, the image plane undesirably tilts.

Expression (28) defines a condition for making the third lens unit L3 properly contribute to zooming with respect to the fourth lens unit L4 and allowing the third lens unit L3 to be fixed during zooming.

Expression (29) represents the proper power arrangement of a lens unit that contributes to zooming. Beyond the upper limit value defined by each of the above expressions, the moving amount for a desired zooming ratio undesirably increases, and the size of the overall lens system undesirably increases. Below the lower limit value, although the moving amount of each lens unit decreases, variations in aberration with zooming, variations in curvature of image field, in particular, undesirably increase.

Both expressions (30) and (24) define a condition required to form a telecentric structure by elongating the exit pupil. Below the lower limit value defined by these expressions, even if a telecentric structure is formed, distortion aberration is caused in the fifth lens unit L5. Beyond the upper limit value, the size of the overall system undesirably increases.

The numerical data of the fifth to seventh numerical embodiments will be described below.

In each numerical embodiment, let ri be the radius of curvature of the ith optical surface from the screen side, di be the thickness or air gap of the ith optical member from the screen side, and ni and vi be the refractive index and Abbe number, respectively, of the material for the ith optical member from the screen side.

In each numerical embodiment, several flat surfaces on the original image side are surfaces constituting a glass block equivalent to a color separating prism or filter.

Table 2 indicates the relationship between the above conditional expressions and the numerical values in each numerical embodiment.

Fifth Numerical Embodiment f=48.33 to 62.23 fno=1:1.7 2ω=54.0° r1=217.821 d1=5.40 n1=1.83400 v1=37.2
r2=3846.350 d2=0.30
r3=165.391 d3=3.20 n2=1.48749 v2=70.2
r4=40.744 d4=17.13
r5=−94.538 d=2.70 n3=1.48749 v3=70.2
r6=228.091 d6=variable
r7=−249.063 d7=2.50 n4=1.80518 v4=25.4
r8=101.539 d8=3.38
r9=2492.387 d9=6.70 n5=1.83400 v5=37.2
r10=−81.490 d10=0.37
r11=51.989 d11=9.80 n6=1.74400 v6=44.8
r12=−605.975 d12=variable
r13=−188.772 (stop) d13=6.70 n7=1.71300 v7=53.9
r14=−29.447 d14=1.80 n8=1.83400 v8=37.2
r15=−69.032 d15=variable
r16=83.164 d16=1.50 n9=1.50300 v9=54.3
r17=38.084 d17=variable
r18=−26.313 d18=2.20 n10=1.69895 v10=30.1
r19=98.652 d19=14.10 n11=1.48749 v11=70.2
r20=−38.570 d20=0.29
r21=−1080.442 d21=7.30 n12=1.74400 v12=44.8
r22=−76.042 d22=variable
*r23=143.880 d23=9.50 n13=1.80400 v13=46.6
r24=−121.332 d24=10.00
r25=∞ d25=45.00 n14=1.51633 v14=64.1
r26=d26=0.00
r27=∞ d27=0.70 n15=1.76000 v15=55.0
r28=∞ d28=0.00
r29=∞ d29=0.20 n16=1.50000 v16=65.0
r30=∞ d30=0.00
r31=∞ d31=2.30 n17=1.49000 v17=65.0
r32=∞ diffractive optical element surface is r23 surface
c1: −7.76419D−05
c2: 2.54643D−08

| Variable Range | Focal Distance | | |
|---|---|---|---|
| | 48.33 | 49.63 | 62.23 |
| d6 | 20.35 | 18.54 | 4.56 |
| d12 | 23.73 | 23.47 | 20.00 |
| d15 | 4.43 | 5.41 | 15.86 |
| d17 | 14.67 | 14.47 | 13.97 |
| d22 | 0.70 | 1.98 | 9.48 | sixth Numerical embodiment f=48.45 to 62.03 fno=1:1.7 2ω=53.9° r1=314.866 d1=5.20 n1=1.83400 v1=37.2
r2=−1014.097 d2=0.30
r3=127.773 d3=3.20 n2=1.48749 v2=70.2
r4=40.765 d4=17.03
r5=−76.844 d5=2.70 n3=1.51633 v3=64.1
r6=393.363 d6=variable
r7=−260.144 d7=2.50 n4=1.80518 v4=25.4
r8=101.583 d8=3.62
r9=−2012.547 d9=6.80 n5=1.83400 v5=37.2
r10=−75.563 d10=0.40
r11=50.991 d11=9.40 n6=1.74400 v6=44.8
*r12=−703.556 d12=variable
r13=−(stop) d13=0.40
r14=−242.322 d14=6.10 n7=1.69680 v7=55.5
r15=−31.956 d15=1.80 n8=1.83400 v8=37.2
r16=−73.514 d16=variable
r17=87.211 d17=1.50 n9=1.60311 v9=60.6
r18=38.077 d18=variable
r19=−24.213 d19=2.20 n10=1.69895 v10=30.1
r20=108.491 d20=13.60 n11=1.48749 v11=70.2
r21=−34.478 d21=0.26
r22=−602668.0 d22=8.90 n12=1.72000 v12=50.2
r23=−68.626 d23=variable
r24=124.459 d24=10.40 n13=1.72000 v13=50.2
r25=−125.804 d25=10.00
r26=∞ d26=45.00 n14=1.51633 v14=64.1
r27=∞ d27=0.00
r28=∞ d28=0.70 n15=1.76000 v15=55.0
r29=∞ d29=0.00
r30=d d30=0.20 n16=1.50000 v16=65.0
r31=∞ d31=0.00
r32=∞ d32=2.30 n17=1.49000 v17=65.0
r33=∞ diffractive optical element surface is r12 surface
c1: 1.61865D−05
c2: −6.03857D−09

| Variable Range | Focal Distance | | |
|---|---|---|---|
| | 48.45 | 51.73 | 62.03 |
| d6 | 19.20 | 14.84 | 3.69 |
| d12 | 21.82 | 21.15 | 17.71 |
| d16 | 6.26 | 8.47 | 16.76 |

-continued

| Variable Range | Focal Distance | | |
|---|---|---|---|
| | 48.45 | 51.73 | 62.03 |
| d18 | 13.21 | 13.00 | 12.33 |
| d23 | 0.70 | 3.74 | 10.70 |

Seventh Numerical Embodiment f=48.29 to 62.39 fno=1:1.7 2ω=54.0° r1=113.540 d1=6.20 n1=1.83400 ν1=37.2
r2=463.721 d2=0.30
r3=154.537 d3=3.20 n2=1.60311 ν2=60.6
r4=41.160 d4=17.68
r5=−85.047 d5=2.70 n3=1.48749 ν3=70.2
r6=156.072 d6=variable
r7=−275.003 d7=2.50 n4=1.80518 ν4=25.4
r8=78.324 d8=2.99
r9=195.088 d9=7.10 n5=1.83400 ν5=37.2
r10=−104.540 d10=0.40
r11=58.340 d11=10.90 n6=1.74400 ν6=44.8
r12=−176.303 d12=variable
r13=∞(stop) d13=0.40
r14=−160.774 d14=5.90 n7=1.71300 ν7=53.9
r15=−33.288 d15=1.80 n8=1.83400 ν8=37.2
r16=−72.383 d16=variable
r17=96.654 d17=1.50 n9=1.60311 ν9=60.6
r18=42.573 d18=variable
r19=−26.491 d19=2.20 n10=1.69895 ν10=30.1
r20=81.583 d20=12.40 n11=1.48749 ν11=70.2
r21=−40.959 d21=0.29
r22=−1136.135 d22=8.00 n12=1.74978 ν12=37.6
*r23=−62.837 d23=variable
r24=122.564 d24=9.80 n13=1.7200 ν13=50.2
r25=−124.504 d25=10.00
r26=∞ d26=45.00 n14=1.51633 ν14=64.1
r27=∞ d27=0.00
r28=∞ d28=0.70 n15=1.76000 ν15=55.0
r29=∞ d29=0.00
r30=∞ d30=0.20 n16=1.50000 ν16=65.0
r31=∞ d31=0.00
r32=∞ d32=2.30 n17=1.49000 ν17=65.0
r33=∞
diffractive optical element surface is r23 surface
c1: −1.60166D-04
c2: 5.95525D-08
   c3: −6.56029D-11

| Variable Range | Focal Distance | | |
|---|---|---|---|
| | 48.29 | 51.95 | 62.39 |
| d6 | 20.01 | 15.48 | 5.03 |
| d12 | 23.74 | 22.24 | 16.97 |
| d16 | 5.08 | 8.63 | 20.11 |
| d18 | 14.11 | 13.95 | 12.56 |
| d23 | 0.70 | 3.34 | 8.98 |

TABLE 2

| Conditional Expression Expression No. | Fifth Embodiment | Sixth Embodiment | Seventh Embodiment |
|---|---|---|---|
| (7) 0 < φ2w/φw < 1.5 | 0.818113 | 0.842473 | 0.856834 |
| (8) ν1n − ν1p > 10 | 33.07 | 33.07 | 33.07 |
| (9) 0 < φ23w/φw < 1.5 | 0.909 | 0.940 | 0.924 |
| (10) 0 < \|φ4w/φw\| < 1.5 | 0.342 | 0.427 | 0.379 |
| (11) ν2p − ν2n > 10 | 19.36 | 19.36 | 19.36 |
| (12) 0 < φ6w/φw < 1.5 | 0.588 | 0.548 | 0.554 |
| (13) \|tk\|/fw > 1.5 | 10.669 | 9.338 | 9.730 |
| (14) 0.9 < bf/fw | 1.038 | 1.036 | 1.048 |
| (15) ν6p > 30 | 46.57 | 50.22 | 50.22 |
| (16) ν6p > 35 | 46.57 | 50.22 | 50.22 |
| (17) 0.4 < \|f1/f2\| < 2.3 | 1.311 | 1.349 | 1.283 |
| (18) 0.5 < f2/√(fw×ft) < 3.5 | 1.077 | 1.049 | 1.027 |
| (19) 1 < \|f1\|/fw < 2.5 | 1.603 | 1.601 | 1.497 |
| (20) 0.4 < Z2/Z < 1.5 | 1.067 | 1.065 | 1.076 |
| (21) 1.0 < \|M2/M5\| < 11.0 | 1.798 | 1.551 | 1.811 |
| (22) 0.4 < M2/(ft − fw) < 1.5 | 1.136 | 1.142 | 1.063 |
| (23) 0.01 < \|f2/f5\| < 0.90 | 0.012 | 0.133 | 0.101 |
| (24) 0.3 < bf/f6 < 2.5 | 0.611 | 0.568 | 0.580 |
| (25) 0.9 < \|f1\|/bf < 2.0 | 1.544 | 1.545 | 1.428 |
| (26) 0.5 < f6/fw < 3.5 | 1.700 | 1.825 | 1.807 |
| (27) 0.7 < \|f1\|/√(fw×ft) < 2.1 | 1.413 | 1.415 | 1.317 |
| (28) 0.6 < \|f4\|/√(fw×ft) < 20 | 2.576 | 2.068 | 2.323 |
| (29) 0.1 < \|f5\|/√(fw×ft) < 100 | 89.795 | 7.881 | 10.145 |
| (30) 0.5 < f6/√(fw×ft) < 3.0 | 1.498 | 1.613 | 1.589 |

An embodiment in which the zoom lens described above is applied as a projection optical system to a projection apparatus will be described next.

Figure 32:
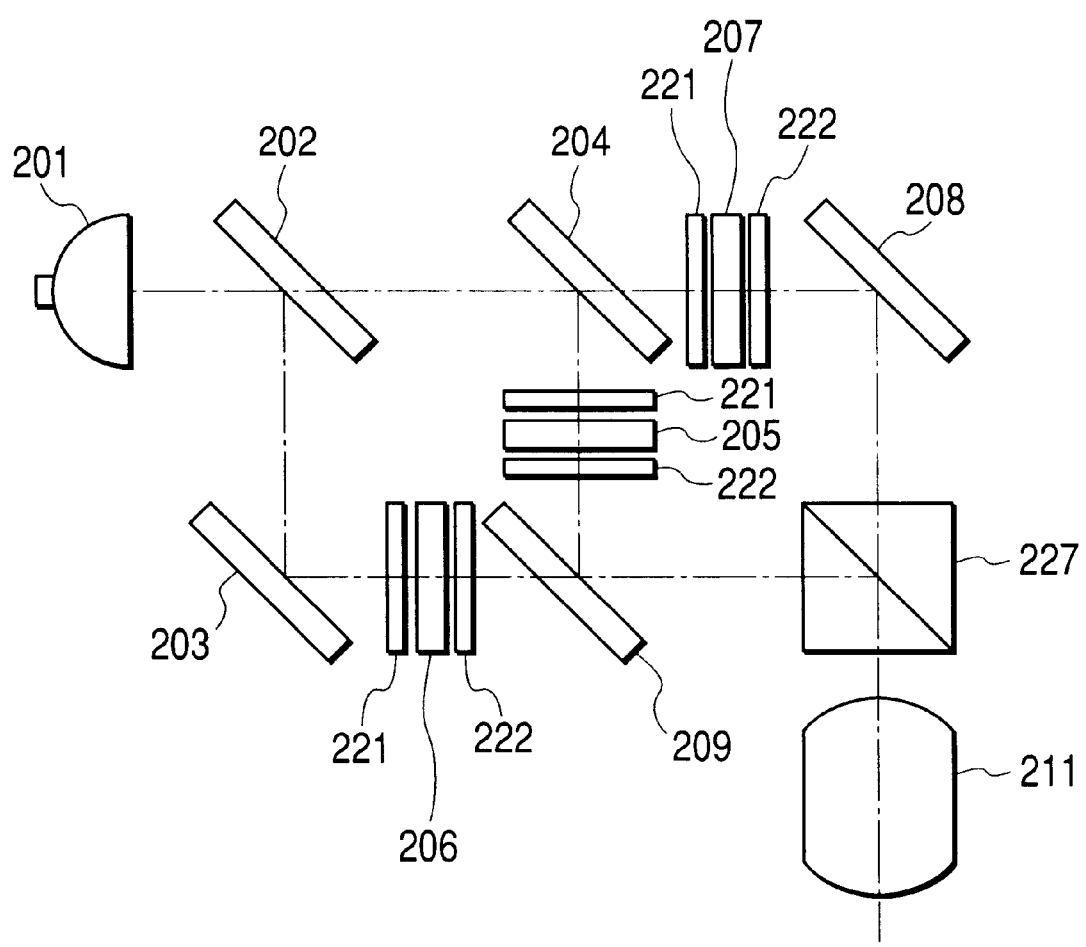
FIG. 32 is a schematic view showing the main part of a projection apparatus.

FIG. 32 is a schematic view showing the main part of a color liquid crystal projector using three dichroic mirrors and one dichroic prism.

Referring to FIG. 32, a red light component (about 600 nm to 700 nm) of light emitted from a light source 201 using a metal halide lamp is reflected by a dichroic mirror 202 for reflecting red light, and the remaining light components are transmitted. The reflected red light component is incident on a red liquid crystal light bulb 206 after the direction of the light component is changed by a reflecting mirror 203. A green light component (about 500 nm to 600 nm) of the light transmitted through the dichroic mirror 202 for reflecting red light is reflected by a dichroic mirror 204 for transmitting blue light, and a blue light component (about 400 nm to 500 nm) is transmitted. The green light component reflected by the dichroic mirror 204 is incident on a green liquid crystal light bulb 205, and the transmitted blue light component is incident on a blue liquid crystal light bulb 207. A polarizer 221 and analyzer 222 are attached to each liquid crystal light bulb to form an image by optically modulating each color light.

The blue light optically modulated by the blue liquid crystal light bulb 207 is reflected by a reflecting mirror 208 to be incident on a dichroic prism 227 for transmitting blue light. This light is transmitted through the dichroic prism 227 to be enlarged/projected by a projection lens 211 formed by the zoom lens of the present invention. The green light optically modulated by the green liquid crystal light bulb 205 is incident on a dichroic mirror 209 for transmitting green light. This green light is reflected by the dichroic mirror 209 to be enlarged/projected by the projection lens 211. The red light optically modulated by the red liquid crystal light valve 206 is incident on the dichroic mirror 209 for transmitting red light. This red light is transmitted through the dichroic mirror 209 to be enlarged/projected by the projection lens 211.

By using the zoom lens of the present invention as a projection lens for a projector in this manner, a compact projector can be realized, which can project good images.

What is claimed is:

1. A zoom lens system which makes two points at different distances have an optically conjugate relationship, sequentially comprising, from a first conjugate point side at a longer distance to a second conjugate point side at a shorter distance:
   a first lens unit having a negative optical power;
   a second lens unit;
   a third lens unit;
   a fourth lens unit;
   a fifth lens unit; and
   a sixth lens unit;
   wherein a plurality of lens units of said first to sixth lens units move for zooming,
   at least one lens unit of said first to sixth lens units has a diffractive optical element, and
   wherein said first and sixth lens units do not move for zooming.

2. A system according to claim 1, wherein said second lens unit has a positive optical power, and said third lens unit has a positive optical power.

3. A system according to claim 2, wherein said fourth lens unit has a negative optical power, said fifth lens unit has a positive optical power, and said sixth lens unit has a positive optical power.

4. A system according to claim 1, wherein said second lens unit has a negative optical power, and said third lens unit has a positive optical power.

5. A system according to claim 4, wherein said fourth lens unit has a negative optical power, said fifth lens unit has a positive optical power, and said sixth lens unit has a positive optical power.

6. A system according to claim 1, wherein said second, third, fourth, and fifth lens units move for zooming.

7. A system according to claim 1, wherein said third lens unit consists of one positive lens element.

8. A system according to claim 1, wherein said fourth lens unit consists of one negative lens element.

9. A system according to claim 1, wherein
   said fourth lens unit moves from the first conjugate point side to the second conjugate point side in zooming from a short focal length end to a long focal length end, and
   letting d4W be a distance between said fourth and fifth lens units at the short focal length end, and d4T be a distance between said fourth and fifth lens units at the long focal length end, a condition defined by $1.1 < d4W/d4T < 3.0$ is satisfied.

10. A system according to claim 1, wherein
    said second lens unit moves from the second conjugate point side to the first conjugate point side in zooming from a short focal length end to a long focal length end, and
    letting d1W be a distance between said first and second lens units at the short focal length end, and d1T be a distance between said first and second lens units at the long focal length end, a condition defined by $1.0 < d1W/d1T < 3.0$ is satisfied.

11. A system according to claim 1, wherein
    said second lens unit moves from the second conjugate point side to the first conjugate point side and said fourth lens unit moves from the first conjugate point side to the second conjugate point side in zooming from a short focal length end to a long focal length end, and
    letting M2 be a moving amount of said second lens unit in zooming from the short focal length end to the long focal length end, and M4 be a moving amount of said fourth lens unit in zooming from the short focal length end to the long focal length end, a condition defined by $0.1 < |M2/M4| < 2.0$ is satisfied.

12. A system according to claim 1, wherein said fourth lens unit moves from the first conjugate point side to the second conjugate point side and said fifth lens unit moves from the second conjugate point side to the first conjugate point side in zooming from a short focal length end to a long focal length end, and
    letting M4 be a moving amount of said fourth lens unit in zooming from the short focal length end to the long focal length end, and M5 be a moving amount of said fifth lens unit in zooming from the short focal length end to the long focal length end, a condition defined by $0.1 < |M5/M4| < 3.0$ is satisfied.

13. A system according to claim 1, wherein
    when said diffractive optical element is expressed by $\phi(H) = 2\pi/\lambda (C_1 \cdot H^2 + C_2 \cdot H^4 + \ldots + C_i \cdot H^{2i})$ where $\lambda$ is a reference wavelength (d line), H is a distance from an optical axis in a vertical direction, Cn is a nth-order phase coefficient, and $\phi(H)$ is a phase shape,
    said diffractive optical element satisfies conditions defined by $1.0 \times 10^{-5} < |C_2/C_1| < 1.0 \times 10^{-1}$ $1.0 \times 10^{-8} < |C_3/C_1| < 1.0 \times 10^{-2}$.

14. A projection apparatus comprising:
    an image display unit for displaying an original image; and
    a projection optical system for projecting the original image on a screen, said projection optical system including said zoom lens system defined by claim 1.

15. A zoom lens system which makes two points at different distances have an optically conjugate relationship, sequentially comprising, from a first conjugate point side at a longer distance to a second conjugate point side at a shorter distance:
    a first lens unit having a negative optical power, said first lens unit not moving for zooming;
    a second lens unit having a positive optical power;
    a third lens unit having a positive optical power;
    a fourth lens unit having a negative optical power;
    a fifth lens unit having a positive optical power; and
    a sixth lens unit having a positive optical power, said sixth lens unit not moving for zooming,
    wherein at least three lens units of said second to fifth lens units move for zooming, and
    at least one lens unit of said first to sixth lens units has a diffractive optical element.

16. A system according to claim 15, wherein letting φ2 be an optical power of said second lens unit, and φw be an optical power of an overall system at a short focal length end, a condition defined by $$0<\phi2/\phi w<1.5$$

is satisfied.

17. A system according to claim 15, wherein said first lens unit has a positive lens element which is located nearest to the first conjugate point side and has a convex surface exhibiting a stronger optical power on the first conjugate point side than on the second conjugate point side.

18. A system according to claim 15, wherein said first lens unit has at least one positive lens element and at least one negative lens element, and satisfies a condition defined by $$v1n-v1p>10$$

where v1p is a smallest Abbe number of Abbe numbers of the positive lens elements which said first lens unit has, and v1n is a largest Abbe number of Abbe numbers of the negative lens elements which said first lens unit has.

19. A system according to claim 15, wherein letting φ23w be a synthetic optical power of said second and third lens units at a short focal length end, and φw be an optical power of an overall system at the short focal length end, a condition defined by $$0<\phi23w/\phi w<1.5$$

is satisfied.

20. A system according to claim 15, wherein letting φ4w be an optical power of said fourth lens unit, and φw be an optical power of an overall system at the short focal length end, a condition defined by $$0<|\phi4w/\phi w|<1.5$$

is satisfied.

21. A system according to claim 15, wherein said second lens unit has at least one positive lens element and at least one negative lens element, and satisfies a condition defined by $$v2p-v2n>10$$

where v2p is a largest Abbe number of Abbe numbers of the positive lens elements which said second lens unit has, and v2n is a smallest Abbe number of Abbe numbers of the negative lens elements which said second lens unit has.

22. A system according to claim 15, wherein said second lens unit has an aperture stop.

23. A system according to claim 15, wherein said third lens unit has an aperture stop.

24. A system according to claim 15, wherein letting φ6w be an optical power of said sixth lens unit, and φw be an optical power of an overall system at a short focal length end, a condition defined by $$0<\phi6w/\phi w<1.5$$

is satisfied.

25. A system according to claim 15, wherein letting fw be a focal length of an overall system at a short focal length end, and tk be a shortest distance in absolute value from a lens surface nearest to the second conjugate point side to a pupil viewed from the second conjugate point side in an entire zooming range, a condition defined by $$|tk|/fw>1.5$$

is satisfied.

26. A system according to claim 15, wherein letting bf be a backfocus, and fw be a focal length of an overall system at a short focal length end, a condition defined by $$0.9<bf/fw$$

is satisfied.

27. A system according to claim 15, wherein letting v6p be an Abbe number of an arbitrary positive lens element which said sixth lens unit has, a condition defined by $$v6p>30$$

is satisfied.

28. A system according to claim 15, wherein said sixth lens unit consists of one positive lens element and satisfies $$v6p>35$$

where v6p is an Abbe number of the positive lens element.

29. A system according to claim 15, wherein letting fw be a focal length of an overall system at a short focal length end, ft be a focal length of the overall system at a long focal length end, and fi is a focal length of an ith lens unit, conditions defined by $$1.1<|f1/f2|<2.3$$

$$0.5<|f2|/\sqrt{(fw\times ft)}<1.5$$

are satisfied.

30. A system according to claim 15, wherein letting f1 be a focal length of said first lens unit, and fw be a focal length of an overall system at a short focal length end, a condition defined by $$1<|f1|/fw<2.5$$

is satisfied.

31. A system according to claim 15, wherein
said second and fifth lens units move for zooming, and letting β2w and β2t be lateral magnifications of said second lens unit at a short focal length end and a long focal length end, respectively, fw and ft be focal lengths of an overall system at the short focal length and the long focal length end, respectively, Z2 be a change β2t/β2w in lateral magnification of said second lens unit in zooming, Z be a change ft/fw in focal length of the overall system, and M2 and M5 be moving amounts of said second and fifth lens units in zooming, conditions defined by $$0.8<Z2/Z<1.1$$

$$1.0<|M2/M5|<11.0$$

$$0.4<M2/(ft-fw)<1.3$$

are satisfied.

32. A system according to claim 15, wherein letting fi be a focal length of an ith lens unit, a condition defined by $$0.01<|f2/f5|<0.9$$

is satisfied.

33. A system according to claim 15, wherein letting bf be a backfocus, and fi be a focal length of an ith lens unit, conditions defined by $$0.3 < bf/f6 < 2.5$$
$$0.9 < |f1|/bf < 1.6$$

are satisfied.

34. A system according to claim 15, wherein letting f6 be a focal length of said sixth lens unit, and fw be a focal length of an overall system at a short focal length end, a condition defined by $$0.5 < f6/fw < 3.5$$

is satisfied.

35. A system according to claim 15, wherein letting fi be a focal length of an ith lens unit, and fw and ft be focal lengths of an overall system at a short focal length end and a long focal length end, conditions defined by $$0.7 < |f1|/\sqrt{(fw \times ft)} < 2.1$$
$$0.6 < |f4|/\sqrt{(fw \times ft)} < 20.0$$
$$0.1 < |f5|/\sqrt{(fw \times ft)} < 10.0$$
$$0.5 < f6/\sqrt{(fw \times ft)} < 3.0$$

are satisfied.

36. A projection apparatus comprising:
an image display unit for displaying an original image; and
a projection optical system for projecting the original image on a screen, said projection optical system including said zoom lens system defined by claim 15.

* * * * *

UNITED STATES PATENT AND TRADEMARK OFFICE
CERTIFICATE OF CORRECTION

PATENT NO.   : 6,639,737 B2
DATED        : October 28, 2003
INVENTOR(S)  : Hiroto Yasui et al.

It is certified that error appears in the above-identified patent and that said Letters Patent is hereby corrected as shown below:

<u>Column 21,</u>
Line 45, please delete "$0.8<Z2/I\ Z<1.1$", and insert therefore -- $0.8<Z2/Z<1.1$ --

<u>Column 22,</u>
Line 45, please delete "$06\int< |f4|/(fwxft) <20.0$" and insert therefore
-- $0.6< |f4|/\sqrt{(fwxft)} <20.0$ --

<u>Column 24,</u>
Line 35, should read -- $r13=\infty$ (stop) $d13=0.40$ --

Signed and Sealed this

Twenty-seventh Day of July, 2004

JON W. DUDAS
*Acting Director of the United States Patent and Trademark Office*